US006506868B1

(12) United States Patent
Goda et al.

(10) Patent No.: US 6,506,868 B1
(45) Date of Patent: Jan. 14, 2003

(54) PARTIAL CONDENSATE OF GLYCIDYL ETHER GROUP-CONTAINING ALKOXYSILANE, SILANE-MODIFIED RESIN, COMPOSITIONS THEREOF AND PREPARATION METHODS THEREOF

(75) Inventors: Hideki Goda, Kyotanabe (JP); Shoji Takeda, Higashiosaka (JP); Tetsuji Higashino, Osaka (JP)

(73) Assignee: Arakawa Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/786,644

(22) PCT Filed: Jul. 14, 2000

(86) PCT No.: PCT/JP00/04737

§ 371 (c)(1),
(2), (4) Date: May 7, 2001

(87) PCT Pub. No.: WO01/05862

PCT Pub. Date: Jan. 25, 2001

(30) Foreign Application Priority Data

| Jul. 15, 1999 | (JP) | ............................................ 11-201446 |
| Aug. 10, 1999 | (JP) | ............................................ 11-225959 |
| Mar. 1, 2000 | (JP) | ...................................... 2000-055552 |
| Apr. 10, 2000 | (JP) | ...................................... 2000-108631 |
| Apr. 17, 2000 | (JP) | ...................................... 2000-115588 |

(51) Int. Cl.$^7$ ........................ C08G 77/04; C08G 59/40; C08G 73/10; C08G 73/14; C08G 65/40
(52) U.S. Cl. .......................... 528/27; 528/34; 528/103; 528/104; 528/106; 528/310; 528/367; 525/393; 525/396; 525/407; 525/452; 525/540; 556/444; 556/467; 556/478
(58) Field of Search ................ 528/27, 34, 103, 528/104, 106, 310, 367; 525/393, 396, 407, 452, 540; 556/444, 467, 478

(56) References Cited

U.S. PATENT DOCUMENTS

| 2,730,532 | A | * | 1/1956 | Martin | ........................ 508/202 |
| 4,278,587 | A | * | 7/1981 | Wolff et al. | .................. 524/262 |
| 4,701,508 | A | * | 10/1987 | Homma et al. | .............. 526/249 |
| 5,206,328 | A | | 4/1993 | Okamura et al. | |
| 5,492,981 | A | * | 2/1996 | Hoehn et al. | ................. 525/476 |
| 5,700,581 | A | | 12/1997 | Sachdev et al. | |
| 5,872,194 | A | * | 2/1999 | Isshiki et al. | ................ 428/447 |
| 5,952,439 | A | * | 9/1999 | Morita et al. | ................ 525/476 |
| 5,994,019 | A | * | 11/1999 | Okado et al. | ............. 430/108.6 |
| 6,143,423 | A | * | 11/2000 | Shiobara et al. | ............. 428/620 |
| 6,225,418 | B1 | * | 5/2001 | Satsu et al. | .................. 257/738 |
| 6,329,460 | B1 | * | 12/2001 | Ishikawa et al. | ............. 524/265 |

FOREIGN PATENT DOCUMENTS

| EP | 0572179 | 12/1993 |
| EP | 0620242 | 10/1994 |
| EP | 1086972 | 3/2001 |
| EP | 1114834 | 7/2001 |
| JP | 57142992 | 9/1982 |
| JP | 3287627 | 12/1991 |
| JP | 4363316 | 12/1992 |
| JP | 10 54979 | 2/1998 |

OTHER PUBLICATIONS

SU 484234 A, Mar. 1976, Assigned to Bazhenova T S, Derwent Abstract.*
JP 01319529 A, Dec. 1989, Saito et al., Derwent Abstract.*

* cited by examiner

Primary Examiner—Robert Dawson
Assistant Examiner—Jeffrey B. Robertson
(74) Attorney, Agent, or Firm—Baker Botts L.L.P.

(57) ABSTRACT

The present invention provides a partial condensate of glycidyl ether group-containing alkoxysilane which is obtainable by dealcoholization reaction between glycidol and a partial condensate of alkoxysilane, compositions comprising the same and preparation methods thereof. Further, the present invention provides an alkoxy-containing silane-modified polyimide resin, alkoxy-containing silane-modified polyamide-imide resin and alkoxy-containing silane-modified phenol resin which are modified with the partial condensate of glycidyl ether group-containing alkoxysilane, and preparation methods thereof.

18 Claims, 8 Drawing Sheets

PARTIAL CONDENSATE OF GLYCIDYL ETHER GROUP-CONTAINING ALKOXYSILANE, SILANE-MODIFIED RESIN, COMPOSITIONS THEREOF AND PREPARATION METHODS THEREOF

CROSS-REFERENCE TO RELATED APPLICATIONS

This application is a national phase application of International Application No. PCT/JP00/04737, which was filed on Jul. 14, 2000 and which published in Japanese on Jan. 25, 2001, which in turn claims priority from Japanese Application No. 11/201446, which was filed on Jul. 15, 1999, Japanese Application No. 11/225959, which was filed on Aug. 10, 1999, Japanese Application No. 2000/55552, which was filed on Mar. 1, 2000, Japanese Application No. 2000/108631, which was filed on Apr. 10, 2000, and Japanese Application No. 2000/115588, which was filed on Apr. 17, 2000.

1. Technical Field

The present invention relates to a partial condensate of glycidyl ether group-containing alkoxysilane, a silane-modified resin, compositions thereof and preparation methods thereof.

2. Background Art

In recent years, there is an increasing demand for high-performance cured products of epoxy resin in the field of electric and electronic materials. In particular, the products having higher heat resistance are required.

In order to improve the heat resistance of the cured products of epoxy resin, glass fibers, glass particles, mica and like fillers are added to epoxy resins and curing agents. However, these methods using fillers can not sufficiently improve heat resistance of the cured products of epoxy resin. By these methods, the transparency of the resulting cured products is deteriorated and the interfacial adhesion between the fillers and the epoxy resin is lowered. Thus, the cured products are given insufficient mechanical properties.

Another method for improving the heat resistance of the epoxy resin cured product is to subjecting the epoxy resin to the reaction with a silane coupling agent. However, employment of the silane coupling agent often lowers the glass transition temperature (Tg) of the resin. In addition, the silane coupling agents are usually expensive and not very favorable in terms of the cost.

Japanese Unexamined Patent Publication No. 1996-100107 proposes a method for improving the heat resistance of cured products of epoxy resin compositions by using the complex of an epoxy resin and silica. The complex of an epoxy resin and silica is prepared by adding hydrolyzable alkoxysilane to a solution of a partially cured epoxy resin to further cure the partially cured product; hydrolyzing the alkoxysilane to cause solation; and polycondensing the sol to cause gelation. The heat resistance of the cured product prepared from such complex is improved to some extent compared to the cured product of the epoxy resin by itself. However, water contained in the complex or water and alcohols produced during curing cause voids (air bubbles) inside the cured product. Further, increasing the amount of alkoxysilane to further improve the heat resistance of the cured product results in impaired transparency and whitening of the cured product due to the aggregation of silica produced by sol-gel curing reaction. In addition, solation of a large amount of the alkoxysilane necessitates a large amount of water, which leads to bends and cracks in the cured product.

Meanwhile, there has been reported many studies on silica complexation of various high molecular compounds other than the epoxy resin, in order to improve their heat resistance, toughness, gas barrier properties and the like, by sol-gel curing reaction of hydrolyzable alkoxysilane (Japanese Unexamined Patent Publications No. 1999-92623, No. 1994-192454, No. 1998-168386, No. 1998-152646, No. 1995-118543, etc.). However, in the complex produced by the sol-gel curing reaction, silica is dispersed within the resin by using the hydrogen bonds between the silanol groups produced by hydrolysis of the hydrolyzable alkoxysilane and hydrogen bonding functional groups in a high molecular compound. Therefore, this reaction can not be employed for the high molecular compounds which have no hydrogen bonding functional groups or the high molecular compounds having high Tg, which tend to aggregate.

DISCLOSURE OF INVENTION

An object of the present invention is to provide a novel partial condensate of glycidyl ether group-containing alkoxysilane, compositions thereof and preparation methods thereof, the partial condensate being capable of improving the heat resistance and other properties of a cured product by adding to or modifying a resin such as epoxy resin, polyimide resin, polyamide-imide resin, phenol resin and the like.

Another object of the present invention is to provide a silane-modified resin modified with the above partial condensate of glycidyl ether group-containing alkoxysilane, a resin composition thereof and preparation methods thereof.

Other objects and features of the present invention are described below.

The present invention provides a partial condensate of glycidyl ether group-containing alkoxysilane which is obtainable by dealcoholization reaction between glycidol and a partial condensate of alkoxysilane, and preparation methods thereof.

Further, the present invention provides a composition comprising the above partial condensate of glycidyl ether group-containing alkoxysilane.

Further, the present invention provides an alkoxy-containing silane-modified polyimide resin which is prepared by subjecting a polyamic acid and the above partial condensate of glycidyl ether group-containing alkoxysilane to epoxy ring-opening esterification, dehydration and cyclization, and preparation methods thereof.

Further, the present invention provides an alkoxy-containing silane-modified polyamide-imide resin which is prepared by subjecting a polyamide-imide resin having a carboxyl group and/or an acid anhydride group at the end(s) of its molecule and the above partial condensate of glycidyl ether group-containing alkoxysilane to epoxy ring-opening esterification, and preparation methods thereof.

Further, the present invention provides a composition comprising the above silane-modified polyamide-imide resin.

Further, the present invention provides an alkoxy-containing silane-modified phenol resin which is prepared by subjecting a phenol resin and the above partial condensate of glycidyl ether group-containing alkoxysilane to epoxy ring-opening reaction, and preparation methods thereof.

Furthermore, the present invention provides a composition comprising the above silane-modified phenol resin.

The inventors of the present invention conducted extensive research to solve the above-mentioned problems of the prior art. Accordingly, the inventors found the following. According to a resin composition which comprises the above specific partial condensate of glycidyl ether group-containing alkoxysilane and an epoxy resin, or a silane-modified resin, which is a high molecular compound such as polyimide resin, polyamide-imide resin, phenol resin or the like modified with the condensate, it is possible to provide a resin silica hybrid which is a cured product having improved heat resistance and mechanical strength and being free from voids, cracks and the like. The present invention was accomplished based on these findings.

Partial Condensate of Glycidyl Ether Group-containing Alkoxysilane

The partial condensate of glycidyl ether group-containing alkoxysilane of the present invention is prepared by dealcoholization reaction between glycidol and the partial condensate of alkoxysilane.

The resulting partial condensate of glycidyl ether group-containing alkoxysilane is typically represented by the following formula (1).

Formula

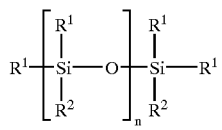
(1)

wherein $R^1$ represents a glycidyl ether group, a $C_1$–$C_3$ alkoxy group or a group represented by the formula

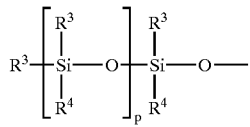
(2)

[in this formula, $R^3$ represents a glycidyl ether group, a $C_1$–$C_3$ alkoxy group or a group represented by the formula

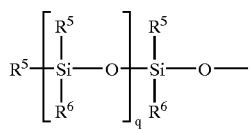
(3)

(in this formula, $R^5$ represents a glycidyl ether group or a $C_1$–$C_3$ alkoxy group, $R^6$ represents a $C_1$–$C_8$ alkyl group or aryl group, a glycidyl ether group or a $C_1$–$C_3$ alkoxy group), $R^4$ represents a $C_1$–$C_8$ alkyl group or aryl group, a glycidyl ether group, a $C_1$–$C_3$ alkoxy group or a group represented by the above formula (3)], $R^2$ represents a $C_1$–$C_8$ alkyl group or aryl group, a glycidyl ether group, a $C_1$–$C_3$ alkoxy group or a group represented by the above formula (2), when the above $R^1$, $R^2$, $R^3$, $R^4$, $R^5$ and $R^6$ are alkoxy groups, each group may be condensed to form a siloxane bond, and the total number of moles of the glycidyl ether groups contained in $R^1$, $R^2$, $R^3$, $R^4$, $R^5$ and $R^6$ is at least 5 mole % based on the total number of moles of $R^1$, $R^2$, $R^3$, $R^4$, $R^5$ and $R^6$, n, p and q are each an integer of 0 or higher, and the average number of Si is 2 to 300.

In the partial condensate of glycidyl ether group-containing alkoxysilane represented by the formula (1), examples of the $C_1$–$C_3$ alkoxy group represented by $R^1$, $R^2$, $R^3$, $R^4$, $R^5$ and $R^6$ include methoxy group, ethoxy group, n-propoxy group and the like. The number of carbon atoms in the alkoxy group greatly influences the condensation rate of an alkoxysilyl portion of the partial condensate of glycidyl ether group-containing alkoxysilane. Thus, when the curing is carried out at a low temperature or high curing rate is desired, methoxy group is preferable. Further, examples of the $C_1$–$C_8$ alkyl group or aryl group represented by $R^2$, $R^4$ and $R^6$ include methyl group, ethyl group, n-propyl group, n-butyl group, isobutyl group, n-hexyl group, cyclohexyl group, n-octyl group, phenyl group, phenethyl group and the like. Although a long-chain alkyl group contributes to improve the flexibility (degree of elongation) of the cured product, it often lowers the glass transition temperature of the resin. For this reason, $R^2$, $R^4$ and $R^6$ are preferably methyl groups in terms of the heat resistance. Further, as mentioned in the above, when the $R^1$, $R^2$, $R^3$, $R^4$, $R^5$ and $R^6$ are alkoxy groups, they may be condensed to form a siloxane bond.

The total number of moles of the glycidyl ether group contained in the above $R^1$, $R^2$, $R^3$, $R^4$, $R^5$ and $R^6$ is at least 5 mole % based on the total number of moles of $R^1$, $R^2$, $R^3$, $R^4$, $R^5$ and $R^6$. All of the groups $R^1$, $R^2$, $R^3$, $R^4$, $R^5$ and $R^6$ (100 mole %) may be the glycidyl ether groups. More specifically, the content of the glycidyl ether group ((the total number of moles of the glycidyl ether groups contained in $R^1$, $R^2$, $R^3$, $R^4$, $R^5$ and $R^6$)/(the total number of moles of the groups $R^1$, $R^2$, $R^3$, $R^4$, $R^5$ and $R^6$)) is 0.05 to 1.

The higher the content of glycidyl ether group, the more polyfunctional the partial condensate of glycidyl ether group-containing alkoxysilane. Hence, in the resin silica hybrid obtained from the silane-modified resin modified with this partial condensate of glycidyl ether group-containing alkoxysilane, since minute silica is uniformly complexed and the transparency and heat resistance of the resulting hybrid are improved, the content of the glycidyl ether group is preferably 0.1 or higher. When the content of the glycidyl ether group is increased, the dealcoholization reaction time between glycidol and partial condensate of alkoxysilane becomes longer. Therefore, the content of the glycidyl ether group is preferable 0.8 or lower.

Each molecule constituting the partial condensate of glycidyl ether group-containing alkoxysilane of the formula (1) does not need to contain the glycidyl ether groups in the above-specified content. However, the glycidyl ether groups need to be contained in the partial condensate of the formula (1) in the above-specified content.

Further, the partial condensate of glycidyl ether group-containing alkoxysilane represented by the formula (1) has the average number of Si in the formula of 2 to 300. Normally, when the average number of Si is high, the partial condensate of glycidyl ether group-containing alkoxysilane tends to have a branched chain such as the group of the formula (2) or the group of the formula (3). The average number of Si is preferably 2 to 100 in terms of the reactivity with glycidol. Further, when the average number of Si is about 2 to 8, the partial condensate has little or no branched structure, and low viscosity which allows easy handling.

The partial condensate of glycidyl ether group-containing alkoxysilane of the present invention is prepared by the dealcoholization reaction between glycidol and partial condensate of alkoxysilane.

As the above partial condensate of alkoxysilane is used a compound prepared by hydrolyzing and partially condensing the hydrolyzable alkoxysilane represented by the formula $$R^a{}_m Si(OR^b)_{4-m} \qquad (4)$$

(wherein m represents 0 or 1, $R^a$ is a $C_1$–$C_8$ alkyl group or aryl group, $R^b$ represents a hydrogen atom or a lower alkyl group.) in the presence of an acid or alkali and water. This partial condensate has the average number of Si of 2 to 300.

The partial condensate of alkoxysilane is typically represented by the following formula (5).

Formula

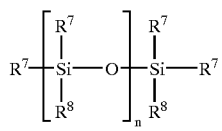
(5)

wherein $R^7$ represents a $C_1$–$C_3$ alkoxy group or the group represented by the formula

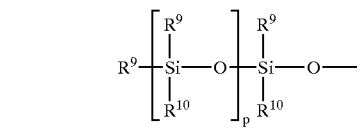
(6)

[in this formula, $R^9$ represents a $C_1$–$C_3$ alkoxy group or the group represented by the formula

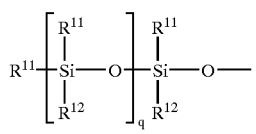
(7)

(in this formula, $R^{11}$ represents a $C_1$–$C_3$ alkoxy group, $R^{12}$ represents a $C_1$–$C_8$ alkyl group or aryl group or a $C_1$–$C_3$ alkoxy group), $R^{10}$ represents a $C_1$–$C_8$ alkyl group or aryl group, a $C_1$–$C_3$ alkoxy group or the group represented by the above formula (7)], $R^8$ represents a $C_1$–$C_8$ alkyl group or aryl group, a $C_1$–$C_3$ alkoxy group or the group represented by the above formula (6), when the above $R^7$, $R^8$, $R^9$, $R^{10}$, $R^{11}$ and $R^{12}$ are alkoxy groups, they may be condensed to form a siloxane bond, n, p and q are each an integer of 0 or higher, and the average number of Si is 2 to 300.

$R^1$ in the-above formula (1) corresponds to $R^7$ in the formula (5), and likewise $R^2$ to $R^8$, $R^3$ to $R^9$, $R^4$ to $R^{10}$, $R^5$ to $R^{11}$, $R^6$ to $R^{12}$. Specifically, the alkoxy groups of $R^7$ to $R^{12}$ in the formula (5) and glycidol undergo dealcoholization reaction to form the glycidyl ether groups in $R^1$ to $R^6$ in the formula (1). Accordingly, examples of the alkyl groups or alkoxy groups of $R^7$ to $R^{12}$, include those of the $R^1$ to $R^2$. Further, as mentioned in the above, when $R^7$ to $R^{12}$ are alkoxy groups, they may be condensed to form a siloxane bond.

Further, when alkyl group or aryl group is not contained as $R^8$, $R^{10}$ and $R^{12}$, the alkoxysilane condensate represented by the formula (5) is a condensate of tetraalkoxysilane, while the alkoxysilane condensate is a condensate of alkyl (or aryl) trialkoxysilane or of a mixture of alkyl(or aryl) trialkoxysilane and tetraalkoxysilane when the alkyl group or aryl group is contained as $R^8$, $R^{10}$ and $R^{12}$.

The used ratio of the glycidol and partial condensate of alkoxysilane can be suitably selected so that the content of the glycidyl ether group in the resulting partial condensate of glycidyl ether group-containing alkoxysilane is in the above-specified range. Normally, it is preferable to conduct the dealcoholization reaction between the glycidol and partial condensate of alkoxysilane at a ratio of the hydroxyl equivalent in the glycidol/the alkoxy equivalent in the partial condensate of alkoxysilane=0.05/1 to 3/1 in starting materials. When this ratio of the starting material is too low, the proportion of unreacted partial condensate of alkoxysilane is increased. Therefore, the ratio of the hydroxyl equivalent of the glycidol in the starting material is preferably 0.1 or higher, based on one alkoxy equivalent of the partial condensate of alkoxysilane. Further, when this ratio of the starting materials is too high, the heat resistance of the cured product tends to be lowered by the remaining unreacted glycidol. Thus, the ratio of the hydroxyl equivalent of the glycidol in the starting material is preferably 1 or lower, based on one alkoxy equivalent of the partial condensate of alkoxysilane.

The reaction between the partial condensate of alkoxysilane and glycidol is carried out, for example, by mixing these ingredients, heating the mixture while removing the produced alcohol to cause dealcoholization reaction, and transesterification of silicic acid ester. The reaction temperature is about 50 to 150° C., preferably 70 to 110° C., and the total reaction time is about 1 to 15 hours.

When the dealcoholization reaction is conducted at a temperature above 150° C., the molecular weight of the reaction product is excessively increased by the condensation of alkoxysilane, and the product may disadvantageously undergo thickening and gelation. Further, the reaction temperature of lower than 50° C. does not allow alcohol to be removed from the reaction system, and the reaction does not proceed.

In the above dealcoholization reaction, conventional catalysts which do not cause epoxy ring opening may be used in order to promote the reaction. Examples of the catalysts include lithium, sodium, potassium, rubidium, cesium, magnesium, calcium, barium, strontium, zinc, aluminum, titanium, cobalt, germanium, tin, lead, antimony, arsenic, cerium, boron, cadmium, manganese and like metals; oxides, organic acid salts, halides and alkoxides of these metals; and the like. Among them, organotin and tin organoate are particularly preferable. More specifically, dibutyltin dilaurate, tin octoate, etc., are effectively used.

The above reaction can be performed in a solvent. The solvent is not particularly limited insofar as it is an organic solvent which can dissolve the alkoxysilane partial condensate and glycidol. Preferable examples of such organic solvent include dimethylformamide, dimethylacetamide, tetrahydrofuran, methyl ethyl ketone, toluene, xylene and like aprotic polar solvents.

The thus obtained partial condensate of glycidyl ether group-containing alkoxysilane does not need to have the glycidyl ether group in all of their molecules constituting this partial condensate. However, the condensate as a whole needs to have the glycidyl ether group in the above-specified proportion, and may contain unreacted partial condensate of alkoxysilane.

The partial condensate of glycidyl ether group-containing alkoxysilane of the present invention may be used as a composition comprising the partial condensate and hydrolyzable alkoxysilane and/or its condensate commonly used for sol-gel method, the hydrolyzable alkoxysilane represented by the formula

(8)

(wherein r represents an integer of 0 to 2. $R^c$ represents a lower alkyl group, aryl group or unsaturated hydrocarbon group which may have a functional group directly bonded to Gag a carbon atom, when r is 2, the two $R^c$'s may be the same or different. $R^d$'s may be the same or different and each represents a hydrogen atom or a lower alkyl group.).

Examples of the hydrolyzable alkoxysilane of the formula (8) include tetramethoxysilane, tetraethoxysilane, tetrapropoxysilane, tetraisopropoxysilane, tetrabutoxysilane and like tetraalkoxysilanes, methyl-trimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, vinyltrimethoxysilane, vinyltriethoxysilane, 3-glycidoxypropyltrimethoxysilane, 3-glycidoxypropyltriethoxysilane, 3-mercaptopropyltrimethoxysilane, 3-mercaptopropyltriethoxysilane, phenyltrimethoxysilane, phenyltriethoxysilane, 3,4-epoxycyclohexylethyltrimethoxysilane, 3,4-epoxycyclohexylethyltrimethoxysilane and like trialkoxysilanes, dimethyl dimethoxysilane, dimethyl diethoxysilane, diethyldimethoxysilane, diethyldiethoxysilane and like dialkoxysilanes. Among these compounds, preferable are the partial condensates of alkoxysilane represented by the above formula (5), which are the condensates of tetraalkoxysilanes and/or trialkoxysilanes.

The used amount of the above hydrolyzable alkoxysilane and/or its partial condensate is preferably about 50 parts by weight or lower, based on 1 part of the partial condensate of glycidyl ether group-containing alkoxysilane of the present invention.

In case of the partial condensate of glycidyl ether group-containing alkoxysilane of the present invention which contains the unreacted partial condensate of alkoxysilane, or in the case of the composition which comprises the partial condensate of glycidyl ether group-containing alkoxysilane of the present invention and the hydrolyzable alkoxysilane and/or its partial condensate, the unreacted substances and ingredients can be converted to silica by hydrolysis and polycondensation. In order to promote the hydrolysis and polycondensation, a small amount of water may be added to the partial condensate of glycidyl ether group-containing alkoxysilane of the present invention before use.

The partial condensate of glycidyl ether group-containing alkoxysilane of the present invention or the composition which comprises the partial condensate of glycidyl ether group-containing alkoxysilane of the present invention and the hydrolyzable alkoxysilane and/or its partial condensate may be used for various applications. For example, they can be favorably used as a curable composition in combination with a curing agent for epoxy resin.

This curable composition may be used in combination with various resins depending on the application. The preferable resin to be used in combination is epoxy resin. Examples of the usable epoxy resins include bisphenol epoxy resins, orthocresol novolac epoxy resin, phenol novolac epoxy resin and like novolac epoxy resin; glycidyl ester epoxy resins obtained by reacting phthalic acid, dimer acid and the like polybasic acids with epichlorohydrin; glycidyl amine epoxy resins obtained by reacting diaminodiphenylmethane, isocyanuric acid and the like polyamines with epichlorohydrin; linear aliphatic epoxy resins, alicyclic epoxy resins and the like obtained by oxidizing an olefin bond with a peracetic acid or like peracids.

Therefore, examples of the application of the partial condensate of glycidyl ether group-containing alkoxysilane of the present invention include a curable composition comprising the partial condensate, the hydrolyzable alkoxysilane and/or its partial condensate, a curing agent for epoxy resin and an epoxy resin. In this case, the partial condensate of glycidyl ether group-containing alkoxysilane and hydrolyzable alkoxysilane and/or its partial condensate are used as additives for epoxy resin. The used amount of the partial condensate of glycidyl ether group-containing alkoxysilane is usually about 1 to 60 parts by weight, based on 100 parts by weight of the epoxy resin.

As the above curing agent for epoxy resin, the curing agents which are usually used as curing agents for epoxy resin can be used without restriction. The useful curing agents include phenol resin curing agent, polyamine curing agent and polycarboxylic acid curing agent. More specifically, examples of the phenol resin curing agents include phenol novolac resin, bisphenol novolac resin, poly p-vinylphenol and the like; examples of the polyamine curing agents include diethylenetriamine, triethylenetetramine, tetraethylenepentamine, dicyandiamide, polyamideamine, polyamide resin, ketimine compound, isophorone diamine, m-xylene diamine, m-phenylene diamine, 1,3-bis(aminomethyl)cyclohexane, N-aminoethylpiperazine, 4,4'-diaminodiphenylmethane, 4,4'-diamino-3,3'-diethyl-diphenylmethane, diaminodiphenyl sulfone and the like; examples of the polycarboxylic acid curing agents include phthalic anhydride, tetrahydrophthalic anhydride, methyl tetrahydrophthalic anhydride, 3,6-endomethylenetetrahydrophthalic anhydride, hexachloroendomethylene tetrahydrophthalic anhydride and methyl-3,6-endomethylenetetrahydrophthalic anhydride. Among these, the polyamine curing agents are preferable. The polyamine curing agents act to open an epoxy ring for curing, and act catalystically on an alkoxysilyl group, cure the alkoxysilyl group to convert it into silica.

The used amount of the curing agent for epoxy resin is usually such that the equivalent ratio of a functional group having an active hydrogen in the curing agent to an epoxy group (the epoxy group of the partial condensate of glycidyl ether group-containing alkoxysilane or the total amount of this epoxy group and the epoxy group of the epoxy resin) in the curable composition is about 0.2:1 to 1.5:1.

The above curable composition may contain an accelerator to promote the curing reaction between the epoxy group and the curing agent. Examples of the accelerator include 1,8-diaza-bicyclo[5.4.0]undecene-7, triethylenediamine, benzyldimethyl amine, triethanolamine, dimethylaminoethanol, tris(dimethylaminomethyl)phenol and like tertiary amines; 2-methylimidazole, 2-phenylimidazole, 2-phenyl-4-methylimidazole, 2-heptadecylimidazole and like imidazoles; tributylphosphine, methyldiphenylphosphine, triphenylphosphine, diphenylphosphine, phenylphosphine and like organic phosphines; tetraphenylphosphonium· tetraphenylboric acid, 2-ethyl-4-methylimidazole·tetraphenylboric acid, N-methylmorpholine·tetraphenylboric acid and like tetraphenylboric acid salts. Preferably, the accelerator is used in an amount of 0.1 to 5 parts by weight, based on 100 parts by weight of the epoxy compound.

The concentration of the above curable composition can be suitably adjusted using a solvent. The solvent may be the same solvent as that used for the preparation of the partial condensate of glycidyl ether group-containing alkoxysilane. Additionally, the above composition may contain, if necessary, fillers, mold releasing agents, surface modifying agents, retardants, viscosity modifiers, plasticizers, antibacterial agents, antimolds, leveling agents, antifoaming agents, coloring agents, stabilizers, coupling agents and the like insofar as it does not lower the effects of the invention.

The partial condensate of glycidyl ether group-containing alkoxysilane of the present invention may be used as a silane coupling agent for inorganic fiber reinforced resins, filler compounds, adhesives, sealing compounds and like applications for which silane coupling agents have been conventionally used.

The partial condensate of glycidyl ether group-containing alkoxysilane of the present invention can be suitably used for preparing various silane-modified resins by modifying various high molecular compounds having a functional group which can react with an epoxy group. Further, resin-silica hybrids can be obtained by curing such silane-modified resins.

Examples of the functional group which can react with an epoxy group include acid anhydride group, carboxyl group, primary amino group, secondary amino group, phenolic hydroxyl group, thiol group and the like. Further, examples of the high molecular compound having these functional groups include polyamide, polythiol, polyaniline, polyamic acid, polyimide, polyamide-imide, polyetherimide, polyester imide, phenol resin, carboxylic acid-terminated polyester, poly(styrene-maleic anhydride), maleated polybutadiene, ethylene-maleic anhydride copolymer, maleic acid-terminated polypropylene, carboxylic acid-terminated butadiene-acrylonitrile copolymer, amine-terminated polyurethane polyurea, ketimine-terminated polyurethane polyurea, polyadipic acid anhydride and like polyacid anhydrides, polyamine-modified epoxy resins and the like.

The partial condensate of glycidyl ether group-containing alkoxysilane of the present invention is highly effective in modifying the above high molecular compounds, especially the high molecular compounds which do not have a hydrogen bonding functional group and thus are not capable of complexation of silica by sol-gel method and the high molecular compounds which have high Tg and high aggregation properties and like compounds. For example, when the partial condensate of glycidyl ether group-containing alkoxysilane of the present invention is used for modifying the high molecular compounds having an acid anhydride group, such as polyamic acid, polyimide, polyetherimide, polyester imide, maleated polybutadiene, ethylene-maleic anhydride copolymer, maleic acid-terminated polypropylene, polyadipic acid anhydride and like polyacid anhydrides, the resin-silica hybrids can be favorably obtained by curing the resulting silane-modified resin.

The reaction ratio between the partial condensate of glycidyl ether group-containing alkoxysilane of the present invention and the high molecular compound having the functional group which can react with an epoxy group is not restricted. The reaction ratio is suitably controlled in consideration of the epoxy equivalent of the partial condensate and the equivalent of the functional group of the high molecular compound, so that the resulting silane-modified resin does not undergo gelation. Further, reaction temperature, reaction time and other reaction conditions are not particularly limited. The reaction is preferably carried out at such a temperature that an alkoxysilyl group is condensed (110° C. for methoxysilyl group) or at a lower temperature. Further, the above examples of the curing agents for epoxy resin and the accelerators may be used in these reactions.

To the thus obtained silane-modified resin may be further added, if necessary, the hydrolyzable alkoxysilane represented by the formula (8) and/or its condensate, depending on its properties insofar as it does not undergo phase separation. Furthermore, to the silane-modified resin may be added, if necessary, solvents, fillers, mold releasing agents, surface modifying agents, retardants, viscosity modifiers, plasticizers, antibacterial agents, antimolds, leveling agents, antifoaming agents, coloring agents, stabilizers, coupling agents and the like, insofar as it does not deteriorate the effects of the present invention.

The partial condensate of glycidyl ether group-containing alkoxysilane of the present invention is a novel compound prepared by introducing a glycidyl ether group to the partial condensate of alkoxysilane. The cured product of the partial condensate of the invention has excellent heat resistance. Further, addition of the partial condensate of the invention to epoxy resins and the like can improve the heat resistance of the cured products of the epoxy resins and the like.

The composition comprising the partial condensate of the glycidyl ether group-containing alkoxysilane of the present invention, the hydrolyzable alkoxysilane condensate and an epoxy resin and the like do not cause whitening or the like in its cured product. Further, the partial condensate of glycidyl ether group-containing alkoxysilane of the present invention may be used as a silane coupling agent and the like.

The reaction of the partial condensate of glycidyl ether group-containing alkoxysilane of the present invention with the high molecular compound having the functional group which can react with an epoxy group can produce a silane-modified resin. Therefore, the partial condensate of glycidyl ether group-containing alkoxysilane of the present invention enables the high molecular compounds, with which it was conventionally difficult to form silica hybrids, to produce resin-silica hybrids.

The partial condensate of glycidyl ether group-containing alkoxysilane of the present invention may be combined with a curing agent for epoxy resin, an epoxy resin and the like and can be suitably used, for example, as various curable compositions. The partial condensate of the invention can react with various resins to produce silane-modified resins and/or their resin compositions. These compositions, for example, are used for various applications such as IC sealing materials, epoxy resin laminates, coating compositions, adhesives, coatings for electric and electronic materials and the like.

Alkoxy-containing Silane-modified Polyimide Resin

One of the silane-modified resins of the present invention, an alkoxy-containing silane-modified polyimide resin is prepared by subjecting a polyamic acid and the partial condensate of glycidyl ether group-containing alkoxysilane of the present invention which is obtained by the dealcoholization reaction between glycidol and the partial condensate of alkoxysilane, to epoxy ring-opening esterification, dehydration and cyclization.

The above polyamic acid can be obtained by reacting a tetracarboxylic acid dianhydride with a diamine in a solvent.

Examples of the tetracarboxylic acid dianhydride include pyromellitic dianhydride, 3,3',4,4'-biphenyltetracarboxylic acid dianhydride, 2,3,3',4'-biphenyltetracarboxylic acid dianhydride, 2,2',3,3'-biphenyltetracarboxylic acid dianhydride, 3,3',4,4'-benzophenonetetracarboxylic acid dianhydride, 2,2',3,3'-benzophenonetetracarboxylic acid dianhydride, 2,2-bis(3,4-dicarboxyphenyl)propane dianhydride, 2,2-bis(2,3-dicarboxyphenyl) propane dianhydride, 1,1-bis(3,4-dicarboxyphenyl)ethane dianhydride, 1,1-bis(2,3-dicarboxyphenyl)ethane dianhydride, bis(3,4-dicarboxyphenyl)methane dianhydride, bis(2,3-dicarboxyphenyl)methane dianhydride, bis(3,4-dicarboxyphenyl)sulfone dianhydride, bis(3,4-dicarboxyphenyl)ether dianhydride, 1,2,3,4-cyclopentanetetracarboxylic acid dianhydride, 2,2-bis(4-(4-aminophenoxy) phenyl)propane dianhydride, 1,2,5,6- naphthalenetetracarboxylic acid dianhydride, 2,3,6,7-naphthalenetetracarboxylic acid dianhydride, 2,3,5,6-pyridinetetracarboxylic acid dianhydride, 3,4,9,10-perylenetetracarboxylic acid dianhydride, 2,2-bis(3,4-dicarboxyphenyl) hexafluoropropane dianhydride and the like conventionally known tetracarboxylic acid dianhydrides. These compounds may be used singly or in combination of two or more kinds.

Examples of the diamine include 4,4'-diaminodiphenylether, 4,4'-diaminodiphenylmethane, 4,4'-diaminodiphenyl sulfone, 4,4'-diaminodiphenylsulfide, benzidine, m-phenylene diamine, p-phenylene diamine, 1,5-naphthalenediamine, 2,6-naphthalenediamine, bis(4-aminophenoxyphenyl) sulfone, bis(3-aminophenoxyphenyl) sulfone, bis(4-aminophenoxy)biphenyl, bis[4-(4-aminophenoxy)phenyl]ether, 1,4-bis(4-aminophenoxy)benzene, 2,2'-dimethyl-4,4'-diaminobiphenyl, 2,2'-diethyl-4,4'-diaminobiphenyl, 3,3'-dimethyl-4,4'-diaminobiphenyl, 3,3'-diethyl-4,4'-diaminobiphenyl, 2,2',3,3'-tetramethyl-4,4'-diaminobiphenyl, 2,2',3,3'-tetraethyl-4,4'-diaminobiphenyl, 2,2'-dimethoxy-4,4'-diaminobiphenyl, 3,3'-dimethoxy-4,4'-diaminobiphenyl, 2,2'-dihydroxy-4,4'-diaminobiphenyl, 3,3'-dihydroxy-4,4'-diaminobiphenyl, 2,2'-di(trifluoromethyl)-4,4'-diaminobiphenyl and the like aromatic diamine compounds and the like. These compounds may be used singly or in combination of two or more kinds.

The solvent is not particularly limited insofar as it can dissolve the tetracarboxylic acid dianhydride, the diamine and the partial condensate of glycidyl ether group-containing alkoxysilane. Examples of the solvent include N-methyl-2-pyrrolidone, N-acetyl-2-pyrrolidone, N,N-dimethylacetamide, N,N-dimethyl sulfoxide, hexamethyl phosphortriamide, dimethylimidazoline, N-acetyl-ε-caprolactam and the like.

The molar ratio of the tetracarboxylic acid dianhydride to the diamine in the synthesis reaction of the polyamic acid is preferably from 0.8 to 1.2. When the ratio is lower than 0.8 or higher than 1.2, the molecular weight of the resulting polyamic acid is not sufficiently high.

The thus obtained polyamic acid itself has a carboxyl group, and can cause epoxy ring-opening esterification with the partial condensate of glycidyl ether group-containing alkoxysilane of the present invention. This reaction is usually conducted at about 50 to 130° C. for 1 to 15 hours, giving an alkoxy-containing silane-modified polyamic acid. When the reaction temperature is lower than 50° C., the progress of the reaction is slow, whereas the reaction temperature is higher than 130° C., the alkoxysilyl portions of the partial condensate cause condensation. Thus the temperature lower than 50° C. or higher than 130° C. is not favorable.

The reaction ratio of the polyamic acid to the partial condensate of glycidyl ether group-containing alkoxysilane in the above reaction is not particularly limited. However, the ratio of the glycidyl ether equivalent of the partial condensate of glycidyl ether group-containing alkoxysilane/the carboxyl equivalent of the polyamic acid is preferably 0.1 to 1.0.

In the reaction between the above polyamic acid and the partial condensate of glycidyl ether group-containing alkoxysilane, a catalyst may be used to promote the reaction. Examples of the catalyst include 1,8-diazabicyclo[5.4.0]undecene-7, triethylenediamine, benzyldimethyl amine, triethanolamine, dimethylaminoethanol, tris(dimethylaminomethyl) phenol and like tertiary amines; 2-methylimidazole, 2-phenylimidazole, 2-phenyl-4-methylimidazole, 2-heptadecylimidazole and like imidazoles; tributylphosphine, methyldiphenylphosphine, triphenylphosphine, diphenylphosphine, phenylphosphine and like organic phosphines; tetraphenylphosphonium·tetraphenyl borate, 2-ethyl-4-methylimidazole tetraphenyl borate, N-methylmorpholine·tetraphenyl borate and like tetraphenyl boron salts and the like. The catalyst is preferably used in an amount of about 0.1 to 5 parts by weight, based on 100 parts by weight of the polyamide-imide resin.

The reaction product obtained by the above reaction has a structure such that the glycidyl ether group of the partial condensate of glycidyl ether group-containing alkoxysilane has underwent epoxy ring opening esterification by the carboxyl group of the polyamic acid. Accordingly, the alkoxy-containing silane-modified polyamic acid produced by this reaction maintains at least 60% of the alkoxy group contained in the partial condensate of glycidyl ether group-containing alkoxysilane, preferably at least 90%.

Furthermore, the above silane-modified polyamic acid may be converted to the desired alkoxy-containing silane-modified polyimide resin by dehydration and cyclization at about 250 to 400° C., if necessary, after being molded. At this time, sol-gel reaction and dealcoholization condensation reaction occur at the alkoxysilyl portions, producing polyimide·silica hybrid.

The above alkoxy-containing silane-modified polyimide resin of the present invention has greatly improved heat resistance, mechanical strength and the like.

This alkoxy-containing silane-modified polyimide resin may contain the various additive mentioned in the above, if necessary, and may be used for the various applications mentioned in the above.

Alkoxy-containing Silane-modified Polyamide-imide Resin

One of the silane-modified resin of the present invention, an alkoxy-containing silane-modified polyamide-imide resin, is prepared by subjecting a polyamide-imide resin having a carboxyl group and/or acid anhydride group at the end(s) of its molecule, and the partial condensate of glycidyl ether group-containing alkoxysilane of the present invention obtained by dealcoholization reaction between glycidol and the partial condensate of alkoxysilane, to epoxy ring-opening esterification.

The above polyamide-imide resin, which has an amide bond and an imide bond in its molecule, is prepared so that it contains a carboxyl group and/or an acid anhydride group at the end(s) of its molecule.

This polyamide-imide resin can be synthesized by condensation reaction between tricarboxylic acids and diisocyanates, or by reacting tricarboxylic acids with diamines to introduce an imide bond to resin chain, and then reacting the reaction product with isocyanates to cause amidation of the product.

Examples of the tricarboxylic acids which constitute the polyamide-imide resin include trimellitic anhydride, butane-1,2,4-tricarboxylic acid, naphthalene-1,2,4-tricarboxylic acid and the like. Examples of the diisocyanates include diphenylmethane-4,4'-diisocyanate (MDI), diphenylether-4,4'-diisocyanate, tolylene diisocyanate, xylene diisocyanate, isophorone diisocyanate and the like. Examples of the diamines include those which correspond to these diisocyanates.

The ratio of the above reaction ingredients in the synthesis of the polyamide-imide resin is not particularly limited insofar as it is in the range which substantially allows a carboxyl group and/or an acid anhydride group to remain at the end(s) of its molecule. Considering the loss of the diisocyanates by the act of the moisture present in the air or in the solvent, it is preferable that the molar ratio of the isocyanate groups to the carboxyl groups and/or acid anhydride groups, or the molar ratio of the amino groups to the carboxyl groups and/or acid anhydride groups is 0.85 or higher but not higher than 1.05.

The molecular weight of the polyamide-imide resin is preferably the weight average molecular weight of not lower than 5000 but lower than 100000, calculated as styrene determined by GPC. The weight average molecular weight of lower than 5000 lowers the elongation rate and flexibility of the film produced from the resin, whereas the weight average molecular weight of higher than 100000 increases the viscosity of the resulting resin, leading to lowered the handling properties of the resin.

In the preparation of the above polyamide-imide resin, dicarboxylic acids and tetracarboxylic acids may be used in combination with the above tricarboxylic acids. These acids may be used in the amount of not higher than 10 mole % of the tricarboxylic acids.

Examples of the dicarboxylic acids which may be used in combination with the tricarboxylic acids include oxalic acid, malonic acid, succinic acid, glutaric acid, adipic acid, pimelic acid, suberic acid, sebacic acid, undecanoic diacid, dodecanoic diacid, tridecanoic diacid, acid anhydrides of these acids and like aliphatic dicarboxylic acids; isophthalic acid, terephthalic acid, diphenylmethane-4,4'-dicarboxylic acid, acid anhydrides of these acids and like aromatic dicarboxylic acids. Examples of the tetracarboxylic acids which may be used in combination with the tricarboxylic acids include diphenylether-3,3',4,4'-tetracarboxylic acid, butane-1,2,3,4-tetracarboxylic acid, benzene-1,2,4,5-tetracarboxylic acid, biphenyl-3,3',4,4'-tetracarboxylic acid, naphthalene-1,2,4,5-tetracarboxylic acid, acid anhydrides of these acids and the like.

The alkoxy-containing silane-modified polyamide-imide resin of the present invention is prepared by reacting the above polyamide-imide resin with the above partial condensate of glycidyl ether group-containing alkoxysilane. This reaction is mainly a ring-opening esterification reaction of epoxy rings between the carboxyl group and/or acid anhydride group of the polyamide-imide resin and the glycidyl ether group of the partial condensate of glycidyl ether group containing-alkoxysilane. In this reaction, the alkoxy group of the partial condensate per se may be possibly consumed by water which may be present in the reaction system or the like. However, the alkoxy group usually does not participate in the ring-opening esterification reaction, and thus remains in the silane-modified polyamide-imide resin in the ratio of 60% or higher. This remaining ratio is preferably 80% or higher.

The above silane-modified polyamide-imide resin is prepared, for example, by mixing the above polyamide-imide resin and the above partial condensate of glycidyl ether group-containing alkoxysilane and heating the mixture to cause ring-opening esterification reaction. The reaction temperature is about 40 to 130° C., preferably 70 to 110° C. The reaction temperature of lower than 40° C. prolongs the reaction time, whereas the reaction temperature of higher than 130° C. promotes the side reaction, i.e., condensation reaction between alkoxysilyl portions. Therefore, the reaction temperature outside the range of 40 to 130° C. is not favorable. When the reaction temperature is about 40 to 130° C., the total reaction time are is usually about 1 to 7 hours.

This reaction is preferably conducted in the presence of a solvent. This solvent is not particularly limited insofar as it is an organic solvent which can dissolve the polyamide-imide resin and the partial condensate of glycidyl ether group-containing alkoxysilane. Examples of such organic solvent include N-methylpyrrolidone, dimethyl formamide, dimethyl acetamide and the like. Further, to these good solvents may be added 30% by weight or less of xylene, toluene and like poor solvents, based on the total amount of the solvents, as far as the polyamide-imide resin and the partial condensate are not deposited.

The method for adding the above solvent to the reaction system is not critical, and may be selected at least one of the following three methods for adding a solvent. (1) The solvent used in the synthesis of the above polyamide-imide resin from the tricarboxylic acid and diisocyanate, or from the tricarboxylic acid and diamine is used as it is. (2) The solvent used in the synthesis of the partial condensate of glycidyl ether group-containing alkoxysilane from the glycidol and the partial condensate of alkoxysilane is used as it is. (3) The solvent is added before the reaction of the above polyamide-imide resin and the above partial condensate of glycidyl ether group-containing alkoxysilane.

In the reaction between the above polyamide-imide resin and the above partial condensate of glycidyl ether group-containing alkoxysilane, a catalyst may be used to promote the reaction. This catalyst may be the same as that used in the reaction between the above polyamic acid and the partial condensate of glycidyl ether group-containing alkoxysilane in the same amount.

In the above-mentioned manner, the silane-modified polyamide-imide resin of the present invention can be obtained. This silane-modified polyamide-imide resin has an alkoxy group derived from the partial condensate of glycidyl ether group-containing alkoxysilane in its molecule. This alkoxy group undergoes sol-gel reaction and dealcoholization condensation reaction by evaporation of solvents, heat treatment or the reaction with water (moisture), forming a mutually bonded cured product. Such cured product has gelated fine silica portions (higher network structure of the siloxane bond).

The silane-modified polyamide-imide resin composition of the present invention is characterized by comprising the above silane-modified polyamide-imide resin. To this resin composition may be added, if desired, conventional polyamide-imide resins, the partial condensate of alkoxysilane, the above partial condensate of glycidyl ether group-containing alkoxysilane of the present invention and the like unless the object of the present invention is departed from.

Usually, the above resin composition is a liquid one having a solid content of about 10 to 40% by weight containing the silane-modified polyamide-imide resin and a medium. Examples of the medium include the good solvents used for the above ring-opening esterification reaction, esters, ketones, alcohols, phenols and like polar solvents. Further, the good solvent may be used in combination with xylene, toluene and like poor solvents.

The amount of the silane-modified polyamide-imide resin in the above resin composition is not particularly limited, and the preferable amount is usually not lower than 50% by weight based on the solid content of the composition.

The silane-modified polyamide-imide resin composition of the present invention may suitably contain, if necessary, fillers, mold releasing agents, surface modifying agents, retardants, viscosity modifiers, plasticizers, antibacterial agents, antimolds, leveling agents, antifoaming agents, coloring agents, stabilizers, coupling agents and the like unless the effects of the present invention are lowered.

The silane-modified polyamide-imide resin composition of the present invention can be applied on various substrate materials by coating, immersing and like methods, and dried by heating to provide a desired cured product. This cured product has silica ($SiO_2$) portions formed by the alkoxysilyl group of the silane-modified polyamide-imide resin, i.e., a higher network structure of a siloxane bond. Therefore, this cured product exhibits high elasticity due to the silica portions. The ratio of the silica portions present in the cured product is not particularly limited. In order to impart high flexibility (elongation rate) to the cured product, the ratio of the silica portions is preferably 30% by weight or lower.

The silane-modified polyamide-imide resin of the present invention and the resin composition may be used for various applications such as heat-resistant fibers, films and like molding materials, IC sealing materials, heat-resistant coating compositions, printed circuited boards, heat-resistant adhesives and the like.

The silane-modified polyamide-imide resin of the present invention and its resin composition demonstrate the prominent effect that they have the conflicting properties such as (1) satisfying mechanical strength and heat resistance; and (2) satisfying flexibility and high elongation rate at the same time. Further, this silane-modified polyamide-imide resin and its composition can achieve high elastic modulus.

Alkoxy-containing Silane-modified Phenol Resin

One of the silane-modified resins of the present invention, an alkoxy-containing silane-modified phenol resin, is prepared by subjecting the phenol resin, and the partial condensate of glycidyl ether group-containing alkoxysilane of the present invention obtained by the dealcoholization reaction between the glycidol and the partial condensate of alkoxysilane, to epoxy ring-opening reaction.

As the phenol resin which forms the alkoxy-containing silane-modified phenol resin of the present invention may be used novolac phenol resins obtainable by reacting phenols with aldehydes in the presence of an acid catalyst, and resol phenol resins obtainable by reacting phenols and aldehydes in the presence of an alkali catalyst. Among them, the resol phenol resin usually contains condensation water, which may cause hydrolysis of the alkoxysilyl portions of the partial condensate of glycidyl ether group-containing alkoxysilane. Thus, the novolac phenol resin is preferably used in the present invention. In particular, when the phenol resin·silica hybrid cured product having high flexibility is desired, alkylphenol novolac resins, among the phenol novolac resins, prepared from cresol and nonylphenol and the like are preferably used. Normally, the phenol resins having the average phenol nucleus number of about 3 to 8 are preferably used.

Examples of the above phenols include phenol, cresol, xylenol, ethylphenol, isopropylphenol, tertiary butyl phenol, amylphenol, octylphenol, nonylphenol, dodecylphenol, chlorophenol, bromophenol and the like. The positions of the substituents in these phenols are not limited. Examples of the useful formaldehydes include formalin, paraformaldehyde, trioxane, tetraoxane and like formaldehyde-generating substances. Further, conventionally known acidic catalysts or alkali catalysts may be used as the catalyst.

The alkoxy-containing silane-modified phenol resin of the present invention is prepared by subjecting the above phenol resin and the above partial condensate of glycidyl ether group-containing alkoxysilane to epoxy ring-opening reaction. This reaction forms the alkoxy-containing silane-modified phenol resin in which the hydroxyl groups of the phenol resin are partially modified with the partial condensate of glycidyl ether group-containing alkoxysilane.

The used ratio of the phenol resin to the partial condensate of glycidyl ether group-containing alkoxysilane in this reaction is not restricted. Preferably, the equivalent ratio of the glycidyl ether group of the partial condensate of glycidyl ether group-containing alkoxysilane/the hydroxyl group of the phenol resin is in the range of 0.1 to 1. However, when the phenol resin having the average nucleus number of 3 or greater is used, the reaction between the glycidyl ether group and the phenolic hydroxyl group is likely to cause gelation. Therefore, the equivalent ratio of the glycidyl ether group/ the hydroxyl group is preferably controlled to be lower than 0.5.

The preparation of the alkoxy-containing silane-modified phenol resin of the present invention is conducted, for example, by mixing the phenol resin and the partial condensate of glycidyl ether group-containing alkoxysilane, heating the mixture to cause epoxy ring-opening reaction. This reaction is preferably performed under substantially anhydrous conditions to prevent the polycondensation of the partial condensate of glycidyl ether group-containing alkoxysilane itself. The main purpose of this reaction is reacting the hydroxyl group of the phenol resin and the epoxy group of the partial condensate of glycidyl ether group-containing alkoxysilane. Thus, it is necessary to inhibit the formation of silica by the sol-gel reaction of the alkoxysilyl portions of the partial condensate of glycidyl ether group-containing alkoxysilane, and the dealcoholization reaction between the alkoxysilyl portions and the phenol resin during the epoxy ring-opening reaction. For this reason, the reaction temperature is about 50 to 120° C., preferably 60 to 100° C., and the total reaction time is preferably about 1 to 10 hours.

In the above epoxy ring-opening reaction, a conventionally known catalyst may be used to promote the reaction. Examples of the catalyst include 1,8-diaza-bicyclo[5.4.0] undecene-7, triethylenediamine, benzyl-dimethyl amine, triethanolamine, dimethylaminoethanol, tris (dimethylaminomethyl)phenol and like tertiary amines; 2-methylimidazole, 2-phenylimidazole, 2-phenyl-4-methyl-imidazole, 2-heptadecylimidazole and like imidazoles; tributylphosphine, methyldiphenylphosphine, triphenylphosphine, diphenylphosphine, phenylphosphine and like organic phosphines; tetraphenylphosphonium·tetraphenyl borate, 2-ethyl-4-methylimidazole - tetraphenyl borate, N-methylmorpholine·tetraphenyl borate and like tetraphenyl borates and the like. The reaction catalyst is preferably used in an amount of 0.01 to 5 parts by weight, based on 100 parts by weight of the epoxy resin.

The above reaction may be performed in a solvent or without a solvent depending on the application. The solvent is not particularly limited insofar as it can dissolve the phenol resin and the partial condensate of glycidyl ether group-containing alkoxysilane (2). Examples of such solvent include N-methylpyrrolidone, dimethyl formamide, dimethyl acetamide, tetrahydrofuran, methyl ethyl ketone, methyl isobutyl ketone, cyclohexanone, xylene and the like.

The thus obtained alkoxy-containing silane-modified phenol resin has the alkoxy group derived from the partial condensate, and the phenolic hydroxyl group derived from the phenol resin in its molecule, but does not have the epoxy group derived from the glycidol. The content of the alkoxy groups is not critical. The alkoxy groups are necessary for forming a mutually bonded cured product by evaporation of solvents, heat treatment, or reaction with water (moisture) to cause sol-gel reaction and dealcoholization condensation. Therefore, 50 to 95 mole %, preferably 60 to 95 mole % of the alkoxy groups of the partial condensate of glycidyl ether group-containing alkoxysilane is left unreacted in the alkoxy-containing silane-modified phenol resin. Further, the content of this phenolic hydroxyl group is not limited.

This alkoxy-containing silane-modified phenol resin can also be cured by heating by the same reaction mechanism as conventional novolac phenol resins when combined with amines and epoxy resins. When this alkoxy-containing silane-modified phenol resin is cured with amines, or when this alkoxy-containing silane-modified phenol resin and the epoxy resin are used in combination, this alkoxy-containing silane-modified phenol resin needs to have the phenolic hydroxyl group to ensure the sufficient progress of the above reaction. Specifically, 30 to 95 mole %, preferably 60 to 90 mole % of the hydroxyl group of the phenol resin is left unreacted in the alkoxy-containing silane-modified phenol resin.

The cured product obtained from such alkoxy-containing silane-modified phenol resin has gelated fine silica portions (higher network structure of the siloxane bond) derived from the partial condensate of glycidyl ether group-containing alkoxysilane. In addition, the alkoxy-containing silane-modified phenol resin of the present invention comprises, as a main component, the phenol resin in which the hydroxyl groups in the phenol resin are partially modified with silane. The alkoxy-containing silane-modified phenol resin of the present invention may contain the unreacted phenol resin and the partial condensate of alkoxysilane (unreacted substances contained in partial condensate of glycidyl ether group-containing alkoxysilane), the partial condensate of glycidyl ether group-containing alkoxysilane, the solvents and catalysts used in the reaction. Incidentally, the unreacted partial condensate of alkoxysilane and the unreacted partial condensate of glycidyl ether group-containing alkoxysilane undergo hydrolysis and polycondensation and form silica when being cured, and is integrated with the alkoxy-containing silane-modified phenol resin.

The alkoxy-containing silane-modified phenol resin composition of the present invention is characterized by comprising the above silane-modified phenol resin.

This resin composition is usually a liquid one containing the alkoxy-containing silane-modified phenol resin and the solvent, having a curing residue of about 10 to 40% by weight. Examples of the solvent for the resin composition include the good solvents used in the above ring-opening esterification reaction, esters, ketones, alcohols, phenols and like polar solvents. Further, these good solvents may be used in combination with xylene, toluene and like poor solvents.

In the resin composition containing the alkoxy-containing silane-modified phenol resin, the Si content calculated as the weight of silica in the curing residue of this resin composition is preferably 2 to 50% by weight. Herein, by the term "Si content calculated as the weight of silica in the curing residue" is meant the percentage by weight of the silica portions in the curing residue when the alkoxysilyl portions of the alkoxy-containing silane-modified phenol resin forms a higher siloxane bond by the sol-gel curing reaction and converted into silica portions by curing, the silica portion being approximately represented by the formula $$R^e_t Si(O)_{(4-t)/2} \quad (9)$$

(wherein t is 0 or 1. Re represents a $C_1$–$C_8$ alkyl group or aryl group.). When the Si content is lower than 2% by weight, the heat resistance, strength and like properties are hardly improved, while the Si content is higher than 50% by weight, the cured product becomes too brittle and the strength may be lowered.

Herein, the term "the curing residue" means a solid content remaining after the solvent of the alkoxy-containing silane-modified phenol resin is removed and the alkoxysilyl portions are cured and converted into silica portions.

The concentration of the above resin composition can be suitably controlled with a solvent, depending on its application. The useful solvent is not particularly restricted insofar as it can dissolve the alkoxy-containing silane-modified phenol resin.

In case the amount of silica of the cured product needs to be controlled for the purpose of controlling the dynamic strength and heat resistance of the cured product, the partial condensate of alkoxysilane and the phenol resin may be added to the above alkoxy-containing silane-modified phenol resin composition. Further, the alkoxy-containing silane-modified phenol resin composition may comprise various conventional curing agents used for curing phenol resins. Specifically, suitable curing agent includes hexamethylenetetramine, melamine resin and like amines. Furthermore, the above silane-modified phenol resin composition may contain conventional acidic or basic catalysts, metal catalysts and like catalysts which can cause sol-gel curing or water to aid silica curing reaction at a low temperature. However, when water is added to the resin composition, the amount of water is preferably 0.6 mole or lower per mole of the alkoxy group of the alkoxy-containing silane-modified phenol resin, in light of the viscosity stability of the alkoxy-containing silane-modified phenol resin composition.

Various additives may be added to the above alkoxy-containing silane-modified phenol resin composition insofar as they do not deteriorate the effects of the present invention, if necessary. Examples of the additives include fillers, mold releasing agents, surface modifying agents, retardants, viscosity modifiers, plasticizers, antibacterial agents, antimolds, leveling agents, antifoaming agents, coloring agents, stabilizers, coupling agents and the like.

The alkoxy-containing silane-modified phenol resin of the present invention may be suitably used as a curing agent for epoxy resin. Hence, the alkoxy-containing silane-modified phenol resin of the present invention is added to a conventional epoxy resin in such an amount that the hydroxyl equivalent in this curing agent is about 0.5 to 1.5, based on 1 epoxy equivalent of the epoxy resin, whereby the epoxy resin composition of the present invention can be prepared.

As the epoxy resin for which the curing agent for epoxy resin of the present invention can be applied may be used various conventional epoxy resins. Examples of such epoxy resins include orthocresol novolac epoxy resin, novolac phenol epoxy resin and like novolac epoxy resins; diglycidyl ether epoxy resins derived from bisphenol A, bisphenol F and the like; glycidyl ester epoxy resins obtained by reacting phthalic acid, dimer acid and the like polybasic acids with epichlorohydrin; glycidyl amine epoxy resins obtained by reacting diaminodiphenylmethane, isocyanuric acid and like polyamines with epichlorohydrin; linear aliphatic epoxy resin and alicyclic epoxy resin obtained by oxidizing an olefin bond with peracetic acid and like peracids and the like. These epoxy resins may be used singly or in combination of two or more kinds suitably.

Further, in the epoxy resin composition of the present invention, in order to promote hydrolysis and polycondensation for curing the alkoxysilyl portions of the alkoxy-containing silane-modified phenol resin may be added a catalyst. Examples of the catalyst include a small amount of water, a catalytic amount of formic acid, acetic acid, propionic acid, p-toluenesulfonic acid, methanesulfonic acid and like organic acid catalysts, boric acid, phosphoric acid and like inorganic acid catalysts and alkali catalysts, organotin and tin organoate catalysts. Moreover, the epoxy resin composition of the present invention may contain an accelerator for accelerating the curing reaction between the epoxy resin and the curing agent. As this accelerator may be used the same compounds as used in the preparation of the above alkoxy-containing silane-modified phenol resin. The accelerator is preferably used in an amount of 0.1 to 5 parts by weight, based on 100 parts by weight of the epoxy resin.

The concentration of the epoxy resin composition can be suitably adjusted with a solvent. The useful solvent may be the same as that used for the preparation of the alkoxy-containing silane-modified phenol resin. Additionally, the epoxy resin composition may contain, if necessary, the same additives as used for the preparation of the above alkoxy-containing silane-modified phenol resin composition, for example, fillers, mold releasing agents, surface modifying agents, retardants and the like.

When the above alkoxy-containing silane-modified phenol resin composition and the epoxy resin composition are used as coating compositions and various coating materials, 0 to 150 parts by weight of conventional pigments are added to 100 parts by weight of the curing residue of the alkoxy-containing silane-modified phenol resin composition. This coating composition is applied on a substrate material using spays, coaters and the like conventional coating devices, and then heated preferably at a temperature not lower than 60° C. to form a coating film. When the above coating composition is for outdoor use, conventional acidic or basic catalysts, metal catalysts and like catalysts which can cause sol-gel curing are preferably added thereto. The used amount of this catalyst may be suitably selected depending on the activity of the used catalyst. Usually, high-performance catalysts such as p-toluenesulfonic acid, tin octoate and the like are used in a molar concentration of about 0.01 to 5 mole %, low-performance catalysts such as formic acid, acetic acid and the like are used in a molar concentration of about 0.1 to 50 mole %, based on the alkoxy group of the used silane-modified phenol resin. Epoxy resins, alkyd resins, maleated oils and the like may added to the resin composition to further increase the flexibility or toughness of the cured film.

When the alkoxy-containing silane-modified phenol resin composition and the epoxy resin composition are used to prepare molded products, the alkoxy-containing silane-modified phenol resin is synthesized without using solvents, and is combined with the above amine curing agents and the epoxy resins, optionally with curing catalysts, various fillers, various fibers and water to give a resin composition. The molding method is not particularly limited, and may be a conventional method for molding thermosetting resins. Examples of the molding method include compression-molding, transfer molding, injection molding and the like. Considering the dimensional stability of the molded product, not lower than 70%, preferably not lower than 90% of silica curing reaction should have been performed before being placed into the mold to prevent shrinkage of the molded product resulting from the methanol generated by silica curing reaction. Thus, the resin composition is pre-heated at 100 to 150° C. before being placed into the mold so that the sol-gel curing reaction which forms the silica portions proceeds. To allow the sol-gel curing reaction to proceed while maintaining the fluidity of this resin, the alkoxy-containing silane-modified phenol resin using o-cresol, nonylphenol and like alkylphenol is preferably used.

The resin composition which uses the alkoxy-containing silane-modified phenol resin of the present invention and the epoxy resin composition containing the alkoxy-containing silane-modified phenol resin as a curing agent for epoxy resin can provide a resin-silica hybrid which is a cured product being excellent in heat resistance, dynamic strength and free of voids (air bubbles) or the like. These resin compositions and resin silica hybrids are suitably used as IC sealing materials, epoxy resin laminates, coating materials for electric-electronic materials, coating compositions, inks and like various applications.

BEST MODE FOR CARRYING OUT THE INVENTION

In the below, Examples, Comparative Examples, Test Examples and Preparation Examples are given to explain the present invention in further details. In these Examples, percentages are by weight unless otherwise specified.

BEST MODE FOR CARRYING OUT THE INVENTION

A 1-liter four-neck flask equipped with a stirrer, water distributor, thermometer and nitrogen inlet was charged with 350 g of glycidol (manufactured by NOF CORPORATION, trade name "Epiol OH") and 671.8 g of tetramethoxysilane partial condensate (manufactured by Tama Chemicals Co., Ltd., trade name "Methyl Silicate 51", in the formula (5), $R^7$ and $R^8$ are methoxy groups; the average number of Si is 4). In a stream of nitrogen, the flask was heated to 80° C. with stirring. Then, 1 g of dibutyltin dilaurate was added as a catalyst to the flask and the mixture was allowed to react at 80° C. During the reaction, methanol was removed from the reaction system using the water distributor. When the amount of the removed methanol become about 130 g, the flask was cooled. The period from completion of heating to initiation of cooling of the flask was 6 hours. After the flask was cooled to 50° C., the nitrogen inlet plug and the water distributor were removed from the flask. A vacuum line was connected to the flask to remove methanol remaining in the system by reducing pressure at 10 kPa for about 15 minutes. During these 15 minutes, about 25 g of methanol was removed under reduced pressure. Thereafter, the flask was cooled to room temperature, giving 869.7 g of a reaction product.

In the starting materials, the ratio of (the hydroxyl equivalent of the glycidol/the methoxy equivalent of the tetramethoxysilane partial condensate) is 0.33, (the average number of Si per molecule of the reaction product/the average number of glycidyl ether groups per molecule of the reaction product) is 1.2. The epoxy equivalent of the reaction product is 184 g/eq.

Figure 1:
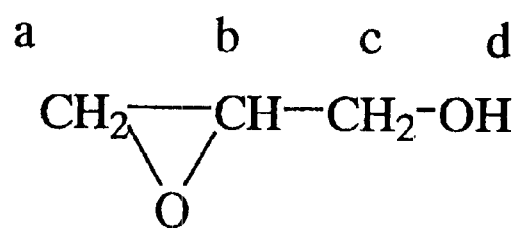
FIG. 1 is a $^1$H-NMR chart of glycidol.
Figure 1:
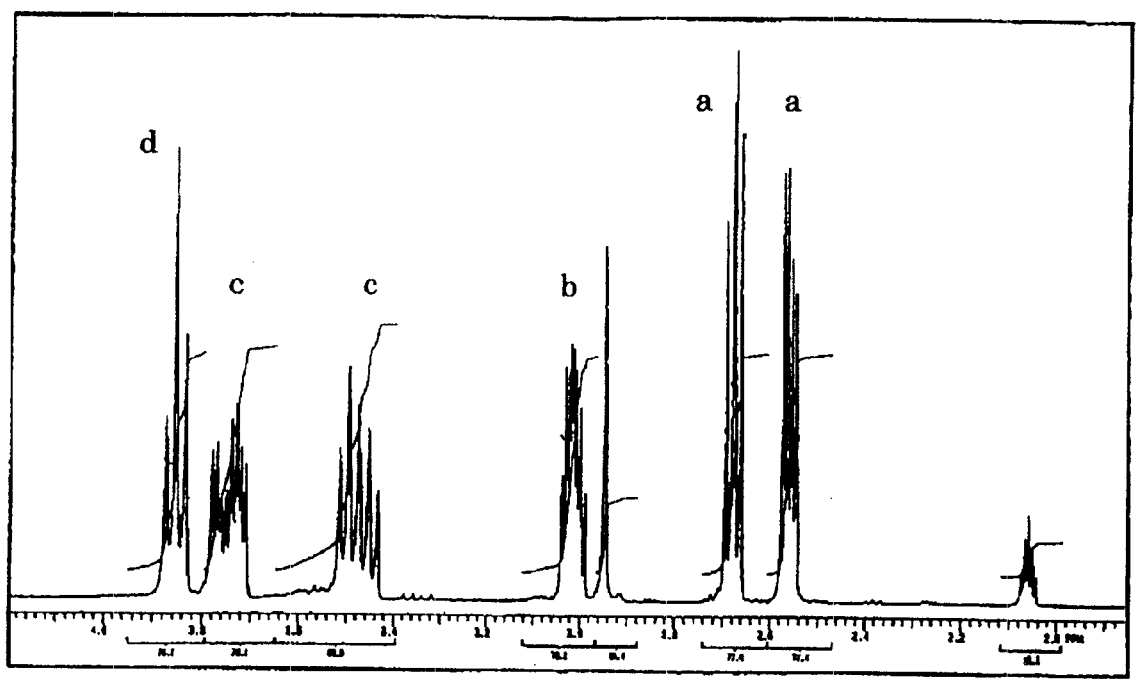
Figure 2:
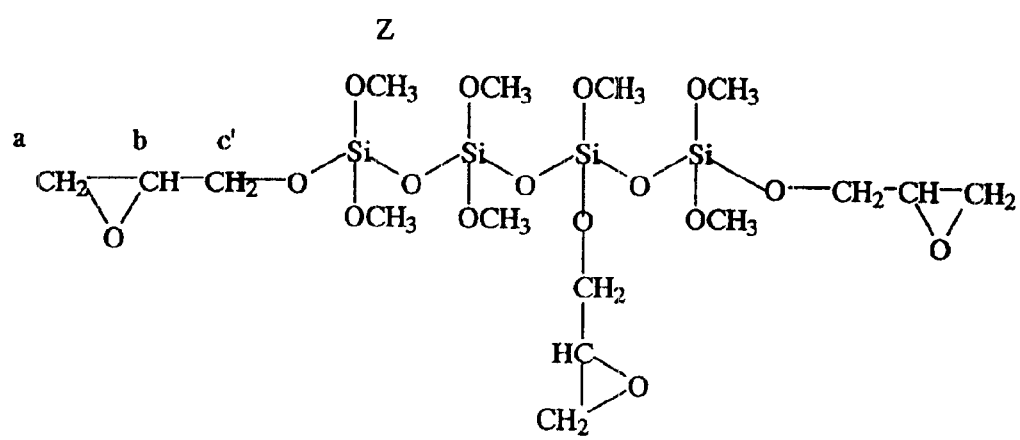
FIG. 2 is a $^1$H-NMR chart of the reaction product prepared in Example 1.
Figure 2:
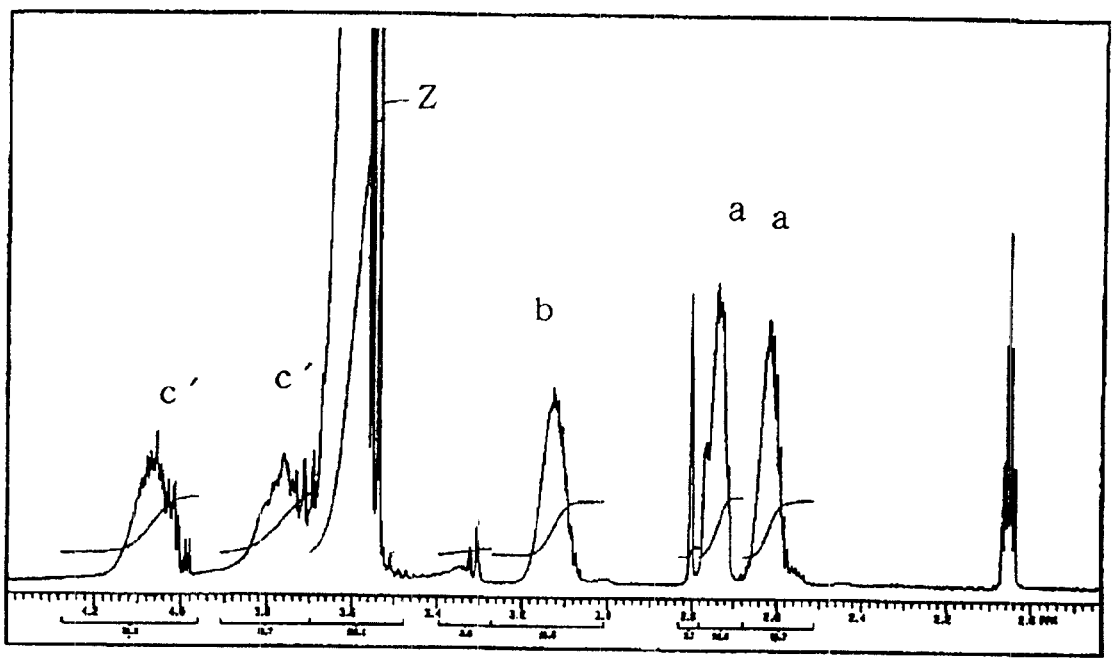

The charts of $^1$H-NMR analysis of the glycidol and the reaction product of Example 1 measured with an acetone-$d_6$ solution are shown in FIG. 1 and FIG. 2. FIG. 2 indicates that the heights of the methylene peak a of the epoxy group of the glycidol (about 2.56 ppm, about 2.68 ppm) and methin peak b (about 3.02 ppm) in FIG. 1 are maintained, that is, the epoxy groups of the glycidol did not participate in the reaction. The peak d of the hydroxyl group of the glycidol (about 3.86 ppm) in FIG. 1 is not observed in FIG. 2. Further, the methylene peak c (about 3.47 ppm, about 3.75 ppm) which is adjacent to the hydroxyl group of the glycidol in FIG. 1 has shifted to c (about 3.78 ppm, about 4.08 ppm) for the reaction product in FIG. 2 by the reaction of the hydroxyl group with the tetramethoxysilane partial condensate. Further in FIG. 2, the peak of the methoxy group (about 3.6 ppm) derived form the partial condensate of alkoxysilane was newly found. It is considered from these results that the reaction product mainly comprises a compound represented by the chemical structural formula shown in FIG. 2.

Example 2

The same reactor used in Example 1 was charged with 350 g of glycidol (manufactured by NOF CORPORATION, trade name "Epiol OH") and 626.2 g of methyl trimethoxysilane partial condensate (manufactured by Tama Chemicals Co., Ltd., prototype "MTMS-A", in the formula (5), $R^7$ represents a methoxy group; $R^8$ represents a methyl group; the average number of Si is 4.5). In a stream of nitrogen, the flask was heated to 80° C. with stirring. Then, 1 g of dibutyltin dilaurate was added to the flask as a catalyst, and the mixture was allowed to react at 80° C. During the reaction, methanol was removed from the reaction system using the water distributor. When the amount of the removed methanol became about 130 g, the flask was cooled. The period from completion of heating to initiation of cooling of the flask was 8 hours. After the flask was cooled to 50° C., the nitrogen inlet plug and the water distributor were removed from the flask. A vacuum line was connected to the flask to removed methanol remaining in the system at 10 kPa for about 15 minutes. During these 15 minutes, about 22 g of methanol was removed under reduced pressure. Thereafter, the flask was cooled to room temperature, giving 825.0 g of a reaction product.

In the starting materials, the ratio of (the hydroxyl equivalent of the glycidol/the methoxy equivalent of the tetramethoxysilane partial condensate) is 0.5, (the average number of Si per molecule of the reaction product/the average number of glycidyl ether groups per molecule of the reaction product) is 1.4, and the epoxy equivalent of the reaction product is 177 g/eq.

As in Example 1, comparisons were made between the charts of the $^1$H-NMR analysis, measured with an acetone-$d_6$ solution, of the glycidol and the reaction product of Example 2. The heights of the methylene peak (about 2.56 ppm, about 2.68 ppm) and methin peak (about 3.02 ppm) of the epoxy group of the reaction product were maintained, showing that the epoxy groups of the glycidol did not participate in the reaction. On the other hand, the peak d (about 3.86 ppm) of the hydroxyl group in the glycidol was not observed. Further, the methylene peak (about 3.47 ppm, about 3.75 ppm) adjacent to the hydroxyl group of the glycidol has shifted to (about 3.78 ppm, about 4.08 ppm) due to the reaction of the hydroxyl group with the partial condensate. Further, the peak (about 3.6 ppm) of the methoxy group derived from the partial condensate and the peak (0.15 ppm) of the methyl group were newly found. It is considered from these results that the reaction product is a compound in which the predetermined amount of the methoxy groups of the methyl trimethoxysilane partial condensate has converted into glycidyl ether groups.

Example 3

The same reactor as in Example 1 was charged with 350 g of glycidol (manufactured by NOF CORPORATION, trade name "Epiol OH") and 636.4 g of tetramethoxysilane partial condensate (manufactured by Tama Chemicals Co., Ltd., trade name "Methyl Silicate 56", in the formula (5), $R^7$ and $R^8$ are methoxy groups; part of $R^7$ is branched, having the structure of the formula (6) or the formula (7); the average number of Si is 18). In a stream of nitrogen, the flask was heated to 80° C. with stirring. Then, 1 g of dibutyltin dilaurate was added to the flask as a catalyst, and the mixture was allowed to react at 80° C. During the reaction, methanol was removed from the reaction system using the water distributor. When the amount of the removed methanol became about 130 g, the flask was cooled. The period from completion of heating to initiation of cooling of the flask was 7.5 hours. After the flask was cooled to 50° C., the nitrogen inlet plug and the water distributor were removed from the flask. A vacuum line was connected to the flask to removed methanol remaining in the system at 10 kPa for about 15 minutes. During these 15 minutes, about 20 g of methanol was removed under reduced pressure. Thereafter, the flask was cooled to room temperature, giving 835.4 g of a reaction product.

In the starting materials, the ratio of (the hydroxyl equivalent of the glycidol/the methoxy equivalent of the tetramethoxysilane partial condensate) is 0.4, (the average number of Si per molecule of the reaction product/the average number of glycidyl ether groups per molecule of the reaction product) is 1.2, and the epoxy equivalent of the reaction product is 175 g/eq.

As in Example 1, comparisons were made between the charts of the $^1$H-NMR analysis of the glycidol and the reaction product of Example 3, measured with an acetone-$d_6$ solution. The results were similar to the charts of Example 1. It is considered from these results that the reaction product is a compound in which the predetermined amount of the methoxy groups of tetramethoxysilane partial condensate has been converted into glycidyl ether groups. Test Examples 1 to 5 and Comparative Test Examples 1 to 2

A bisphenol A epoxy resin (manufactured by Tohto Kasei Co., Ltd., trade name "Epotohto YD-011") was dissolved in dimethyl formamide to prepare an epoxy resin solution having a solid content of 50%. At the same time, dicyandiamide was dissolved in dimethyl formamide to prepare a dicyandiamide solution having a solid content of 20%. The epoxy resin solution, the reaction product of Example 1, Example 2 or Example 3 and the dicyandiamide solution was mixed. in the proportions (parts by weight) shown in Table 1, giving curable resin compositions. In Test Example 3 and Comparative Test Example 2, tetramethoxysilane partial condensate was additionally used to prepare curable resin compositions.

The resin compositions prepared in Test Examples and Comparative Test Examples were placed into separate containers (length×width×height=10 cm×10 cm×1.5 cm) with fluororesin coatings. Removal of the solvents and curing were carried out at 150° C. for 30 minutes and then at 175° C. for 1 hour.

The curable resin compositions of Test Examples 1 to 5 and Comparative Test Example 1 were capable of providing transparent cured films (about 0.4 mm in thickness). On the other hand, the cured product prepared from the curable resin composition of Comparative Test Example 2 was whitened and very brittle due to the 15 tetraalkoxysilane partial condensate contained therein. Therefore, the curable resin composition of Comparative Test Example 2 could not provide a cured product which can be subjected to the heat resistance test described below. Heat resistance test The cured films produced by using the resin compositions obtained in Test Examples 1 to 5 and Comparative Test Example 1 were cut into pieces (6 mm×25 mm). The test pieces were tested for their dynamic modulus of stored elasticity by viscoelasticity meter (manufactured by Rheology Corporation, trade name "DVE-V4", measurement conditions: amplitude: 1 μm, frequency: 10 Hz, slope: 3° C./min.). The heat resistance of the test pieces was evaluated based on the measurement of the dynamic modulus of stored elasticity. The results of measurement are shown in FIG. 3 and FIG. 4.

Figure 3:
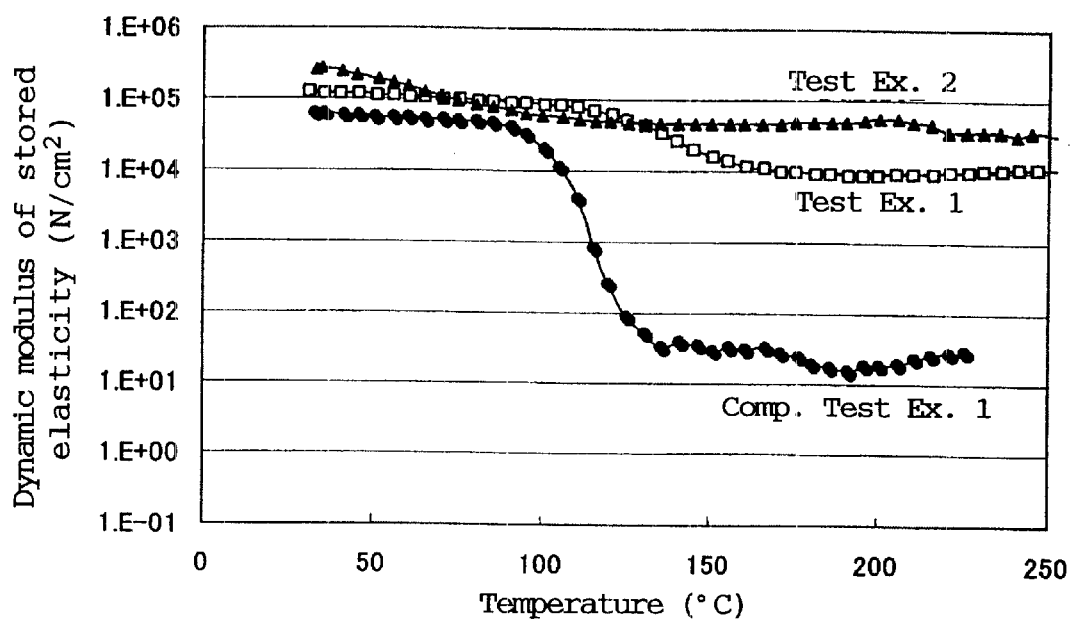
FIG. 3 is a graph showing the evaluation results of the heat resistance of the cured films prepared in Test Examples 1, 2 and Comparative Test Example 1.
Figure 4:
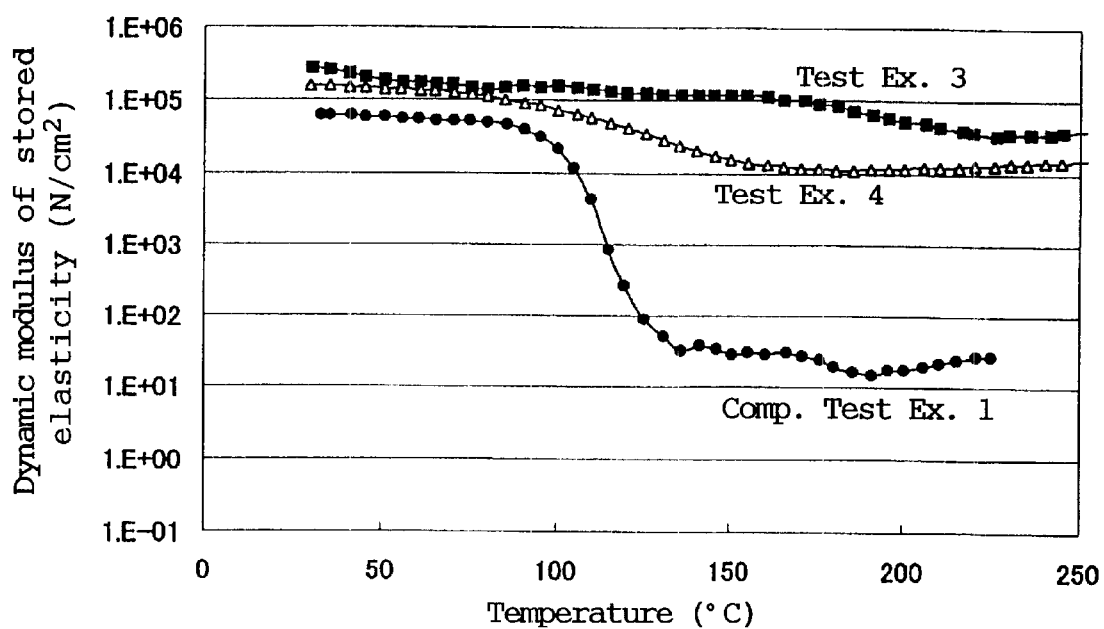
FIG. 4 is a graph showing the evaluation results of the heat resistance of the cured films prepared in Test Examples 3, 4 and Comparative Test Example 1.
Figure 5:
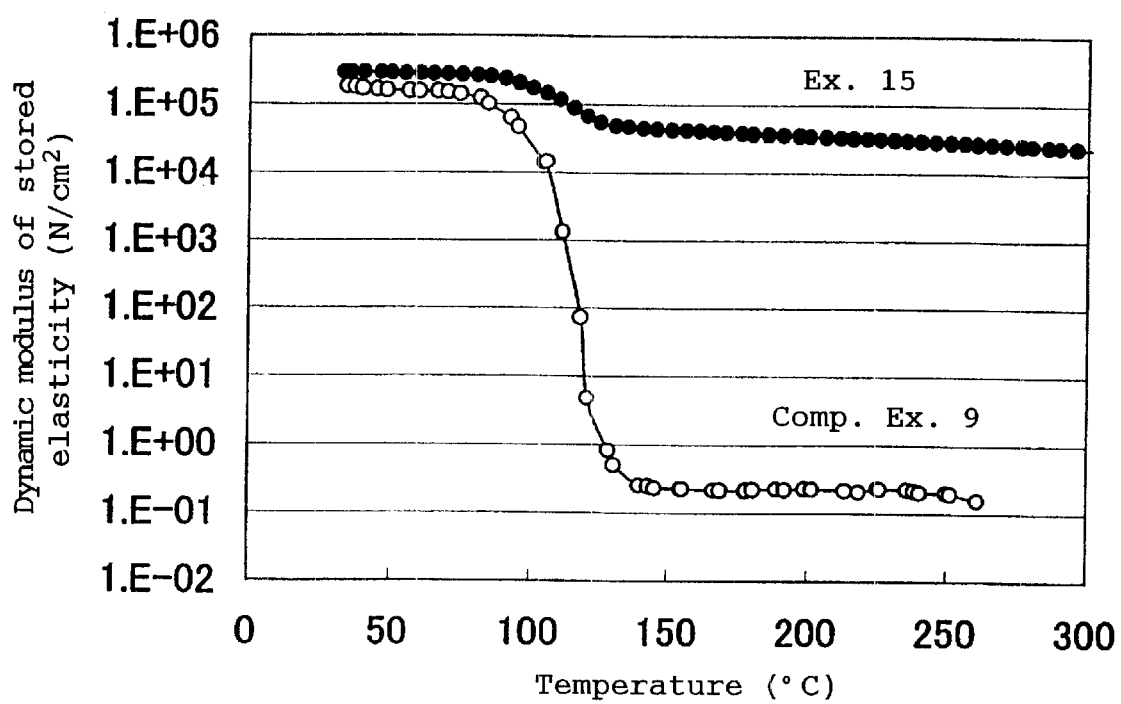
FIG. 5 is a graph showing the evaluation results of the heat resistance of the cured films prepared in Example 15 and Comparative Example 9.
Figure 6:
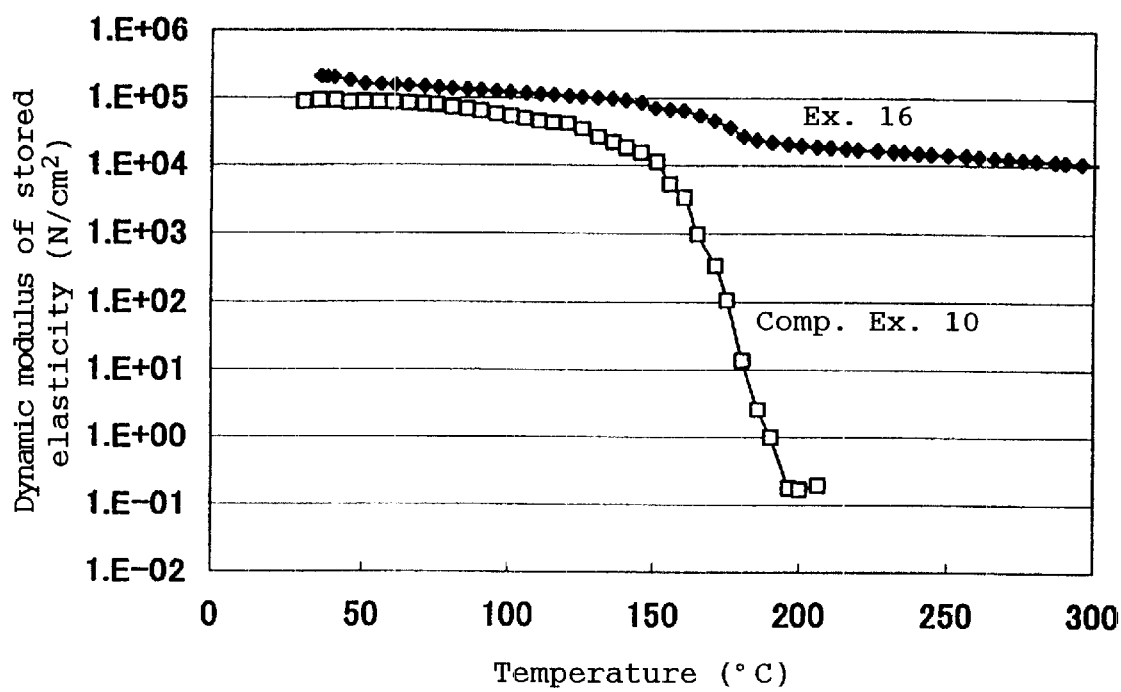
FIG. 6 is a graph showing the evaluation results of the heat resistance of the cured films prepared in Example 16 and Comparative Example 10.
Figure 7:
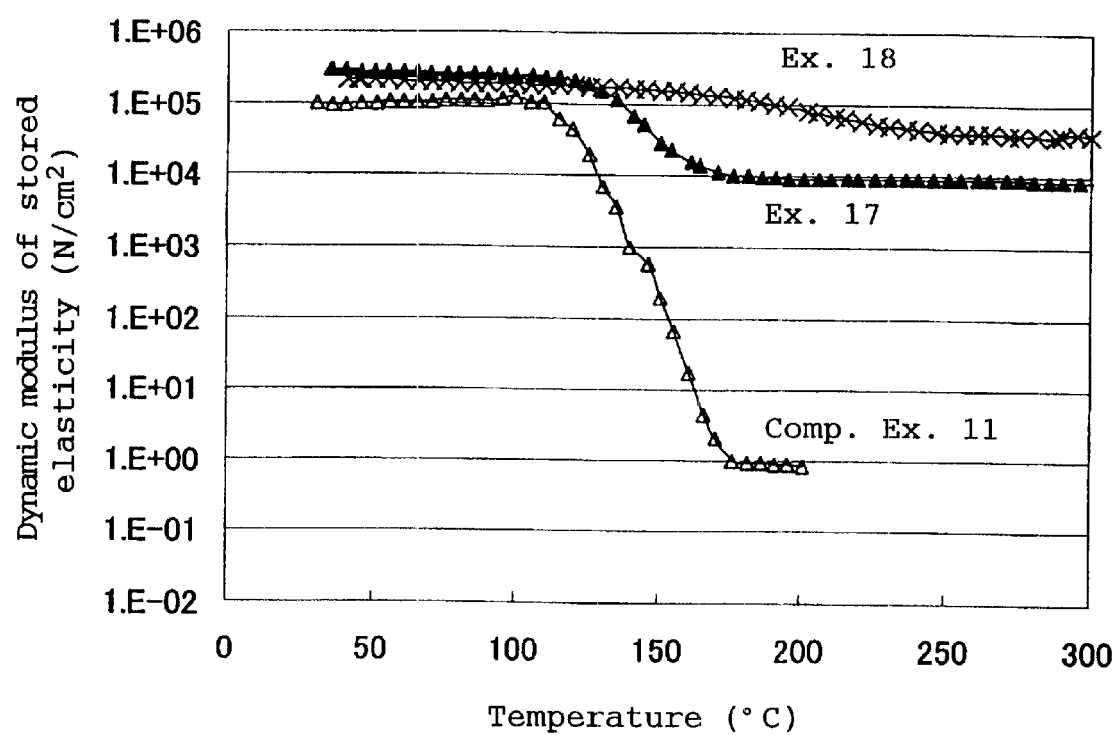
FIG. 7 is a graph showing the evaluation results of the heat resistance of the cured films prepared in Examples 17, 18 and Comparative Example 11.
Figure 8:
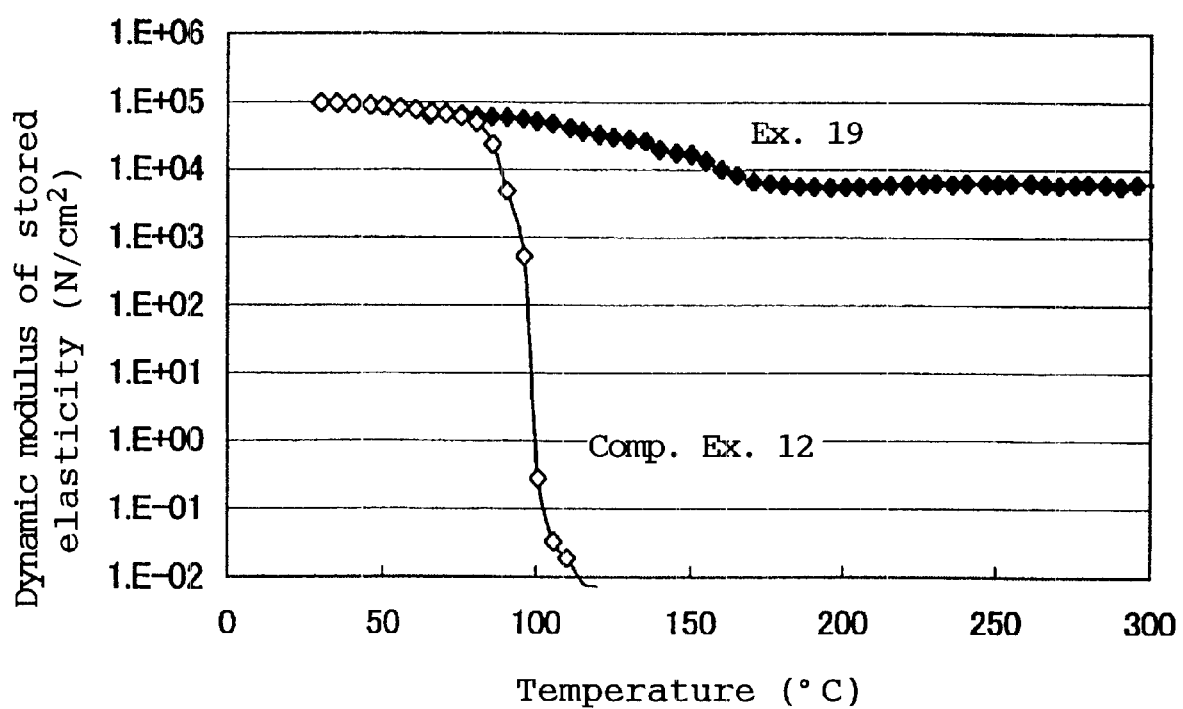
FIG. 8 is a graph showing the evaluation results of the heat resistance of the cured films prepared in Example 19 and Comparative Example 12.

FIG. 3 and FIG. 4 indicate the followings. The cured product (the epoxy resin cured product) of Comparative Test Example 1 has underwent glass transition, and was softened at high temperatures. Meanwhile, the cured products of Test Examples 1 and 4 had high elastic modulus at high temperatures. The glass transition temperature of the cured product was scarcely observed for cured products of Test Examples 1 and 4, and thus they were not softened at high temperatures. The measurement results of the viscoelasticity of Test Example 5 were exactly the same as those of Test Example 1. Further, the glass transition temperatures of the cured products of Test Examples 2 and 3 were scarcely observed. These results show that the epoxy resin cured products of Test Examples 1 to 5 have greatly improved heat resistance.

Example 4

The same reactor as in Example 1 was charged with 178.7 g of glycidol (manufactured by NOF CORPORATION, trade-name "Epiol OH") and 892.6 g of a tetramethoxysilane partial condensate (manufactured by Tama Chemicals Co., Ltd., trade name "Methyl Silicate 56", in the formula (5), $R^7$ and $R^8$ are methoxy groups; part of $R^7$ is branched, forming the structure of the formula (6) or the formula (7); the average number of Si is 18). In a stream of nitrogen, the flask was heated to 80° C. with stirring. Then, 1 g of dibutyltin dilaurate was added to the flask as a catalyst, and the mixture was allowed to react at 80° C. During the reaction, methanol was removed from the reaction system using the water distributor. When the amount of the removed methanol became about 73 g, the flask was cooled. The period from completion of heating to initiation of cooling of the flask was 4 hours. After the flask was cooled to 50° C., the nitrogen inlet plug and the water distributor were removed from the flask. A vacuum line was connected to the flask to removed methanol remaining in the system at 10 kPa for about 15 minutes. During these 15 minutes, about 10 g of methanol was removed under reduced pressure. Thereafter, the flask was cooled to room temperature, giving 989.4 g of a reaction product.

In the starting materials, the ratio of (the hydroxyl equivalent of the glycidol/the methoxy equivalent of the tetramethoxysilane partial condensate) is 0.14, (the average number of Si per molecule of the reaction product/the average number of glycidyl ether groups per molecule of the reaction product) is 3.4, and the epoxy equivalent of the reaction product is 410 g/eq.

As in Example 1, comparisons were made between the charts of the $^1$H-NMR analysis of the glycidol and the reaction product of Example 4, measured with an acetone-$d_6$ solution. The results were similar to the charts of Example 1. It is considered from these results that the reaction product is a compound in which the predetermined amount of the methoxy groups of the tetramethoxysilane partial condensate has converted into glycidyl ether groups.

EXAMPLE REGARDING ALKOXY-CONTAINING SILANE-MODIFIED POLYIMIDE RESIN

Example 5

A 1.5-liter four-neck flask equipped with a stirrer, cooling pipe, thermometer and nitrogen inlet was charged with 100 g of bis-(4-aminophenyl) ether and 879.6 g of dimethyl acetamide, followed by stirring. To the flask was slowly added 119.9 g of pyromellitic acid with stirring at room temperature. The mixture was stirred for 1 hour, giving a polyamic acid having an acid anhydride group at each end. Subsequently, to the polyamic acid was added 61.5 g of the partial condensate of glycidyl ether group-containing alkoxysilane obtained in Example 4. The mixture was allowed to react at 95° C. for 3 hours, giving a silane-modified polyamic acid. In the silane-modified polyamic acid, (the glycidyl ether equivalent of the condensate/the carboxyl equivalent of the polyamic acid) is 0.25. Furthermore, this solution was poured over a glass plate which was then heated at 100° C. for 1 hour to remove dimethyl acetamide therefrom. The glass plate was further heated at 300° C., giving a pale yellow and transparent polyimide silica hybrid film. The (silica /polyimide) ratio of this film was 0.14 (by weight).

Comparative Example 1

The same reactor as in Example 5 was charged with 100 g of bis-(4-aminophenyl) ether and 836 g of dimethyl acetamide, followed by stirring. To the flask was slowly added 109 g of pyromellitic acid with stirring at room temperature. The mixture was stirred for 1 hour, giving a polyamic acid having an acid anhydride group at each end. Furthermore, to this polyamic acid were added 54.9 g of tetramethoxysilane partial condensate (manufactured by Tama Chemicals Co., Ltd., trade name "Methyl Silicate 51", in the formula (5), $R^7$ and $R^8$ are methoxy groups; the average number of Si is 4) and 5.2 g of water. The mixture was stirred at room temperature for 1 hour. Furthermore, this solution was poured over a glass plate which was then heated at 100° C. for 1 hour to remove dimethyl acetamide therefrom. The glass plated was further heated at 300° C., giving a whitened film having the phase separation of silica and polyimide. The (silica /polyimide) ratio of this film was 0.14 (by weight).

EXAMPLE REGARDING ALKOXY-CONTAINING SILANE-MODIFIED POLYAMIDE-IMIDE RESIN

Preparation Example 1

(Preparation of Polyamide-imide Resin)

A reactor equipped with a stirrer, cooling pipe and thermometer was charged with 1160 g of N-methylpyrrolidone, 290 g of xylene, 345.8 g of trimellitic anhydride and 425.0 g of 4,4'-diphenylmethanediisocyanate. In a stream of nitrogen, the mixture was reacted at 90° C. for 2 hours. Subsequently, the nitrogen stream was stopped, and the mixture was heated to 135° C. over 1 hour. After the reaction was continued for 3.5 hours, the mixture was cooled and diluted with N-methylpyrrolidone/xylene=4/1 (by weight), giving a polyamide-imide resin solution having a nonvolatile content of 25%. The weight average molecular weight (calculated as styrene by GPC) of this polyamide-imide resin was 12000.

Preparation Example 2
(Preparation of Polyamide-imide Resin)

The same reactor as in Preparation Example 1 was charged with 1175 g of N-methylpyrrolidone, 294 g of xylene, 345.8 g of trimellitic anhydride and 437.3 g of 4,4'-diphenylmethanediisocyanate. In a stream of nitrogen, the mixture was allowed to react at 90° C. for 2 hours. Subsequently, the nitrogen stream was stopped, and the mixture was heated to 135° C. over 1 hour. After the reaction was continued for 15 hours, the mixture was cooled and diluted with N-methylpyrrolidone/xylene=4/1 (by weight), giving a polyamide-imide resin solution having a nonvolatile content of 25%. The weight average molecular weight (calculated as styrene by GPC) of this polyamide-imide resin was 30000.

Preparation Example 3
(Preparation of the Partial Condensate of Glycidyl Ether Group-containing Alkoxysilane)

The same reactor as in Preparation Example 1 was charged with 250.00 g of glycidol (manufactured by NOF CORPORATION, trade name "Epiol OH") and 799.81 g of tetramethoxysilane partial condensate (manufactured by Tama Chemicals Co., Ltd., trade name "Methyl Silicate 51"). In a stream of nitrogen, the flask was heated to 90° C. with stirring. Then, 1.00 g of dibutyltin dilaurate was added to the reactor as a catalyst to cause demethanolization reaction. During the reaction, methanol was removed from the reaction system using the water distributor. When the amount of the removed methanol became about 90 g, the reactor was cooled. The period from completion of heating to initiation of cooling of the flask was 6 hours. After the flask was cooled to 50° C., the nitrogen inlet plug and the water distributor were removed from the flask. A vacuum line was connected to the flask to remove methanol remaining in the system by reducing pressure at 13 kPa for about 15 minutes. During these 15 minutes, about 21.0 g of methanol was removed under reduced pressure. Thereafter, the flask was cooled to room temperature, giving 929.81 g of a partial condensate of glycidyl ether group-containing alkoxysilane.

In the starting materials, the ratio of (the hydroxyl equivalent of the glycidol/the methoxy equivalent of the tetramethoxysilane partial condensate) is 0.2, (the average number of Si per molecule of the reaction product/the average number of glycidyl ether groups per molecule of the reaction product) is 2. The epoxy equivalent of the reaction product is 278 g/eq.

Example 6
(Preparation of Silane-modified Polyamide-imide Resin)

The same reactor as in Preparation Example 1 was charged with 200 g of the polyamide-imide resin solution obtained in Preparation Example 1 and 5.17 g of the partial condensate of glycidyl ether group-containing alkoxysilane obtained in Preparation Example 3. After the reactor was heated to 95° C., the mixture was allowed to react for 4 hours. To the reactor was added 8.26 g of N-methylpyrrolidone. The mixture was cooled, giving a silane-modified polyamide-imide resin solution having a nonvolatile content of 25%.

Examples 7 to 10

The procedure of Example 6 was followed except that the kinds or the amounts of the polyamide-imide resin solution or the partial condensate of glycidyl ether group-containing alkoxysilane, or the amount of N-methylpyrrolidone was changed as shown in Table 2, giving silane-modified polyamide-imide resin solutions each having a nonvolatile content of 25%.

Comparative Example 2

The polyamide-imide resin solution obtained in Preparation Example 1 was used as a control resin solution.

Comparative Example 3

A solution was prepared by adding 5.51 g of tetramethoxysilane partial condensate (manufactured by Tama Chemicals Co., Ltd., trade name "Methyl Silicate 56") to 200 g of the polyamide-imide resin solution obtained in Preparation Example 1. This solution was used as a control resin solution.

Comparative Example 4

The polyamide-imide resin solution obtained in Preparation Example 2 was used as a control resin solution.

Comparative Example 5

A solution was prepared by adding 2.47 g of tetramethoxysilane partial condensate (manufactured by Tama Chemicals Co., Ltd., trade name "Methyl Silicate 56") to 200 g of the polyamide-imide resin solution obtained in Preparation Example 2. This resin solution was used as a control resin solution.

Subsequently, the polyamide-imide resins obtained in Examples and Comparative Examples were subjected to tensile tests to determine their linear elastic modulus and maximum elongation rate.

Formation of Cured Film

A glass plate was coated with the silane-modified or unmodified polyamide-imide resin solution obtained in Examples 6 to 10 and Comparative Examples 2 to 5 using an applicator (wet 100 μm). The glass plate was dried and cured stepwise in a drier at 80° C. for 30 minutes, at 150° C. for 30 minutes and at 250° C. for 30 minutes. The glass plate was left to cool to room temperature, giving cured films.

Because the cured films obtained in Comparative Examples 3 and 5 were whitened and brittle, many cracks were formed in the films when peeled from the glass plate. Therefore, these films could not be subjected to the test described below.

Tensile Test

The cured films obtained the above (film width: 15 mm) were stretched by a Tensilon testing machine (manufactured by ORIENTEC Co., trade name "UCT-500"), in an atmosphere at 25° C. at a elongation rate of 20 mm/min. to determine their linear elastic modulus and the film elongation (maximum elongation rate) until the films were broken. The average of three measurements for each film is shown in Table 3.

It is apparent from Table 3 that elastic modulus of the polyamide-imide films can be improved by silanemodifying while maintaining the elongation rate of the polyamide-imide films.

Further, the silica content of the cured films obtained in the above was calculated from the proportion of the starting materials. The silica content (% by weight) in the above cured films, i.e., polyamide-imide·silica hybrid films is shown in Table 4.

EXAMPLE REGARDING ALKOXY-CONTAINING SILANE-MODIFIED PHENOL RESIN

Preparation Example 4
(Preparation of the Partial Condensate of Glycidyl Ether Group-containing Alkoxysilane)

A reactor equipped with a stirrer, water distributor, thermometer and nitrogen gas inlet was charged with 200 g of glycidol (manufactured by NOF CORPORATION, trade name "Epiol OH") and 1997.6 g of tetramethoxysilane partial condensate (manufactured by Tama Chemicals Co., Ltd., trade name "Methyl Silicate 56"). In a stream of nitrogen, the mixture was heated to 90° C. with stirring. Then, 2 g of dibutyltin dilaurate was added as a catalyst to the mixture and allowed to react. During the reaction, methanol was removed from the reaction system using the water distributor. When the amount of the removed methanol became about 60 g, the flask was cooled. The period from completion of heating to initiation of cooling of the reactor was 6 hours. After the reactor was cooled to 50° C., the nitrogen inlet and water distributor were removed from the reactor. A vacuum line was connected to the reactor to remove about 29 g of methanol remaining in the system by maintaining the system at 13 kPa for about 20 minutes. Thereafter, the system was cooled to room temperature, giving 2110.2 g of a partial condensate of glycidyl ether group-containing alkoxysilane.

In the starting materials, the ratio of (the hydroxyl equivalent of the glycidol/the methoxy equivalent of the tetramethoxysilane partial condensate) is 0.07, (the average number of Si per molecule of the reaction product/the average number of glycidyl ether groups per molecule of the reaction product) is 6.8, and the epoxy equivalent of the reaction product is 782 g/eq.

Preparation Example 5
(Preparation of the Partial Condensate of Glycidyl Ether Group-containing Alkoxysilane)

The same reactor as in Preparation Example 4 was charged with 400 g of glycidol (manufactured by NOF CORPORATION, trade name "Epiol OH") and 1791.6 g of tetramethoxysilane partial condensate (manufactured by Tama Chemicals Co., Ltd., trade name "Methyl Silicate 51"). In a stream of nitrogen, the mixture was heated to 90° C. with stirring. Then, 2 g of dibutyltin dilaurate was added as catalyst to the mixture and allowed to react. During the reaction, methanol was removed from the reaction system using a water distributor. When the amount of the removed methanol become about 150 g, the flask was cooled. The period from completion of heating to initiation of cooling of the reactor was 6 hours. After the reactor was cooled to 50° C., the nitrogen inlet and water distributor were removed from the reactor. A vacuum line was connected to the reactor to remove about 25 g of methanol remaining in the system by maintaining the system at 13 kPa for about 20 minutes. Thereafter, the system was cooled to room temperature, giving 2018.2 g of a partial condensate of glycidyl ether group-containing alkoxysilane.

In the starting materials, the ratio of (the hydroxyl equivalent of the glycidol/the methoxy equivalent of the tetramethoxysilane partial condensate) is 0.14, (the average number of Si per molecule of the reaction product/the average number of glycidyl ether groups per molecule of the reaction product) is 2.8, and the epoxy equivalent of the reaction product is 374 g/eq.

Example 11

A reactor equipped with a stirrer, cooling pipe, thermometer and nitrogen inlet was charged with 700 g of orthocresol novolac resin (manufactured by Arakawa Chemical Industries, LTD, trade name "KP7516") and 600 g of methyl ethyl ketone. The mixture was dissolved at 85° C. Furthermore, 683.9 g of the partial condensate of glycidyl ether group-containing alkoxysilane obtained in Preparation Example 4 and, as a catalyst, 2.0 g of 2-methylimidazole were added to the solution. The mixture was allowed to react at 85° C. for 4 hours. The mixture was cooled to 80° C., giving an alkoxy-containing silane-modified phenol resin solution (i) (the phenolic hydroxyl equivalent of this solution: 400 g/eq) having 55% of a curing residue.

In the starting materials, the equivalent ratio of (the glycidyl equivalent of the partial condensate of glycidyl ether group-containing alkoxysilane/the phenolic hydroxyl equivalent of the above phenol resin) is 0.15. The Si content in the curing residue is 33%, calculated as silica weight.

Example 12

The same reaction as in Example 11 was performed except that 800 g of t-butylphenol novolac resin (manufactured by Arakawa Chemical Industries, LTD, trade name "Tamanol 1000S") was used in place of 700 g of orthocresol novolac resin, and the mount of methyl ethyl ketone was changed to 500 g, the amount of the partial condensate of glycidyl ether group-containing alkoxysilane obtained in Preparation Example 4 was changed to 771.3 g. This reaction afforded an alkoxy-containing silane-modified phenol resin solution (ii) (phenolic hydroxyl equivalent of this solution: 522 g/eq) having 60% of a curing residue.

In the starting materials, the equivalent ratio of (the glycidyl equivalent of the partial condensate of glycidyl ether group-containing alkoxysilane/the phenolic hydroxyl equivalent of the above phenol resin) is 0.2. The Si content in the curing residue is 33%, calculated as silica weight.

Example 13

The same reaction as in Example 11 was performed except that 600 g of t-butylphenol novolac resin (manufactured by Arakawa Chemical Industries, LTD, trade name "Tamanol 100S") was used in place of 700 g of the orthocresol novolac resin; the amount of methyl ethyl ketone was changed to 500 g; and the amount of the partial condensate of glycidyl ether group-containing alkoxysilane obtained in Preparation Example 4 was changed to 867.7 g. This reaction produced an alkoxy-containing silane-modified phenol resin solution (iii) (phenolic hydroxyl equivalent of this solution: 758 g/eq) having 56% of a curing residue.

In the starting materials, the equivalent ratio of (the glycidyl equivalent of the partial condensate of glycidyl ether group-containing alkoxysilane/the phenolic hydroxyl equivalent of the above phenol resin) is 0.3. The Si content in the curing residue is 42%, calculated as silica weight.

Example 14

The same reaction as in Example 11 was performed except that 800 g of t-octylphenol novolac resin (manufactured by Arakawa Chemical Industries, LTD, trade name "KP7515") was used in place of 700 g/of orthocresol novolac resin; the amount of methyl ethyl ketone was changed to 500 g; and the amount of the partial condensate of glycidyl ether group-containing alkoxysilane obtained in Preparation Example 4 was changed to 716.5 g. This reaction produced an alkoxy-containing silane-modified phenol resin solution (iv) (phenolic hydroxyl equivalent of this solution: 732 g/eq) having 60% of a curing residue.

In the starting materials, the equivalent ratio of (the glycidyl equivalent of the partial condensate of glycidyl ether group-containing alkoxysilane/the phenolic hydroxyl equivalent of the above phenol resin) is 0.25. The Si content in the curing residue is 31%, calculated as silica weight.

Comparative Example 6

An orthocresol novolac resin (manufactured by Arakawa Chemical Industries, LTD, trade name "KP7516") was dissolved in methyl ethyl ketone, giving a control resin solution (v) having a nonvolatile content of 50%.

Comparative Example 7

A t-butylphenol novolac resin (manufactured by Arakawa Chemical Industries, LTD, trade name "Tamanol 100S") was dissolved in methyl ethyl ketone, giving a control resin solution (vi) having a nonvolatile content of 50%.

Comparative Example 8

A t-octylphenol novolac resin (manufactured by Arakawa Chemical Industries, LTD, trade name "KP7515") was dissolved in methyl ethyl ketone, giving a control resin solution (vii) having a nonvolatile content of 50%.

Examples 15 to 19 and Comparative Examples 9 to 12 (Preparation of Epoxy Resin Composition)

The above alkoxy-containing silane-modified phenol resin solutions, epoxy resin solutions, a catalyst and solvents are mixed in the proportions as shown in Table 5 and Table 6 to prepare the epoxy resin compositions of the present invention and comparative epoxy resin compositions.

In Table 5, the abbreviations and equivalent ratios are as follows.

EP1 : Bisphenol A epoxy resin solution (nonvolatile content: 50%), manufactured by Tohto Kasei Co., Ltd., trade name "Epotohto YD-011", EP2 : bisphenol A epoxy resin solution (nonvolatile content: 50%), manufactured by Tohto Kasei Co., Ltd., trade name "Epotohto YD-127", SnL: Dibutyltin dilaurate, DMF: Dimethyl formamide, Equivalent ratio: (The epoxy equivalent of the epoxy resin)/(the phenolic hydroxyl equivalent of alkoxy-containing phenol resin).

In Table 6, the abbreviations are the same as described in the above. The equivalent ratio is (the epoxy equivalent of the epoxy resin)/(the phenolic hydroxyl equivalent of the phenol resin).

The epoxy resin compositions obtained in Examples 15 to 19 and Comparative Examples 9 to 12 were each placed into an aluminum foil container (length×width×depth=5 cm×5 cm×1.5 cm). The containers were heated at 90° C. for 1 hour and at 210° C. for 2 hours to remove the solvents therefrom and cure the resin compositions, giving transparent cured films (film thickness: about 0.3 mm).

The dynamic modulus of stored elasticity of the cured films prepared from the epoxy resin composition of Examples 15 to 19 and Comparative Examples 9 to 12 were measured by viscoelasticity meter (manufactured by Rheology Corporation, trade name "DVE-V4", measurement conditions: amplitude: 1 μm, frequency: 10 Hz, slope: 3° C./min.) to evaluate their heat resistance. The measurement results are shown in FIG. 5 to FIG. 8. The FIG. 5 to FIG. 8 indicate that the glass transition temperature (Tg) of the cured films of Examples are scarcely observed, revealing that the cured films have Sexcellent heat resistance.

Example 20

The same reactor as in Example 11 was charged with 700 g of orthocresol novolac resin (manufactured by Arakawa Chemical Industries, LTD, trade name "KP7516"). The orthocresol novolac resin was dissolved at 90° C. Furthermore, to the reactor were added 218.1 g of the partial condensate of glycidyl ether group-containing alkoxysilane obtained in Preparation Example 5, 100 g of methyl ethyl ketone and 1 g of 2-methylimidazole as a catalyst. The mixture was allowed to react at 90° C. for 1 hour, giving an alkoxy-containing silane-modified phenol resin solution (phenolic hydroxyl equivalent of this solution: 194 g/eq).

In the starting materials, the equivalent ratio of (the glycidyl equivalent of the partial condensate of glycidyl ether group-containing alkoxysilane/the phenolic hydroxyl equivalent of the above phenol resin) is 0.10. The Si content in the curing residue was 14%, calculated as silica weight.

At the same temperature, 10 g of tin octoate was added to the resulting alkoxy-containing silane-modified phenol resin with stirring. The mixture was stirred at the same temperature for 5 minutes. The resulting silane-modified phenol resin composition was transferred to an aluminum container. The resin composition was cured at 150° C. for 30 minutes and then at 210° C. for 1 hour, giving a precured product for a phenol resin·silica hybrid.

The precured product was pulverized by a pulverizer. 200 g of the pulverized powdery product and 15 g of hexamethylenetetramine powder were mixed. The mixture was placed into a mold (10 mm×60 mm×2 mm) and press-molded at 180° C. and at a pressure of 40 kg/cm², giving a cured product of a phenol resin·silica hybrid.

Comparative Example 13

The procedure of Example 20 was repeated except that novolac phenol resin (manufactured by Arakawa Chemical Industries, LTD, trade name "Tamanol 759") was used in place of the precured product for the phenol resin·silica hybrid, giving a molded product.

The molded products obtained in Example 20 and Comparative Example 13 were subjected to a three-point bending test to determine the dynamic properties these molded products. The results are shown in Table 7.

What is claimed is:

1. A curable composition comprising
   (a) a partial condensate of a glycidyl ether group-containing alkoxysilane which is obtained by dealcoholization reaction between glycidol and a partial condensate of alkoxysilane;
   (b) a hydrolyzable alkoxysilane represented by the formula $$R^c{}_r Si(OR^d)_{4-r} \qquad (8)$$

wherein r represents an integer of 0 to 2, $R^c$ represents a lower alkyl group, aryl group or an unsaturated hydrocarbon group which may have a functional group directly bonded to a carbon atom, wherein, when r is 2, the two $R^c$'s may be the same or different, $R^d$'s may be the same or different and each represent a hydrogen atom or lower alkyl group, a condensate of the hydrolyzable alkoxysilane, or a combination thereof; and c) a curing agent for epoxy resin.

2. A curable composition which is obtained by adding an epoxy resin to the composition of claim 1.

3. An alkoxy-containing silane-modified polyimide resin which is obtained by a method comprising the steps of epoxy ring-opening esterification of a polyamic acid and a partial condensate of glycidyl ether group-containing alkoxysilane prepared by dealcoholization reaction between glycidol and a partial condensate of alkoxysilane, dehydration and cyclization of the esterification product.

4. A method for preparing an alkoxy-containing silane-modified polyimide resin, the method comprising the steps of epoxy ring-opening esterification of a polyamic acid and a partial condensate of glycidyl ether group-containing alkoxysilane prepared by dealcoholization reaction between glycidol and a partial condensate of alkoxysilane, dehydration and cyclization of the esterification product.

5. An alkoxy-containing silane-modified polyamideimide resin which is obtained by epoxy ring-opening esterification of a polyamide-imide resin having a carboxyl group, an acid anhydride group, or a combination thereof at the end or ends of its molecule; and a partial condensate of glycidyl ether group-containing alkoxysilane prepared by dealcoholization reaction between glycidol and a partial condensate of alkoxysilane.

6. A silane-modified polyamide-imide resin composition comprising the silane-modified polyamide-imide resin of claim 5.

7. The resin composition according to claim 6, wherein the amount of the silane-modified polyamide-imide resin is not lower than 50% by weight of the solid content of the composition.

8. A method for preparing an alkoxy-containing silane-modified polyamide-imide resin, the method comprising performing epoxy ring-opening esterification of a polyamide-imide resin having a carboxyl group and/or acid anhydride group at the end(s) of its molecule; and a partial condensate of glycidyl ether group-containing alkoxysilane prepared by dealcoholization reaction between glycidol and a partial condensate of alkoxysilane.

9. The method according to claim 8, wherein the epoxy ring-opening esterification reaction of the polyamide-imide resin and the partial condensate of glycidyl ether group-containing alkoxysilane is performed in the presence of a solvent.

10. The method according to clime 8, wherein a reaction temperature of the polyamide-imide resin and the partial condensate of glycidyl ether group-containing alkoxysilane is room temperature to 150° C.

11. An alkoxy-containing silane-modified phenol resin which is obtained by epoxy ring-opening reaction between a phenol resin; and a partial condensate of glycidyl ether group-containing alkoxysilane prepared by dealcoholization reaction between glycidol and a partial condensate of alkoxysilane.

12. The alkoxy-containing silane-modified phenol resin according to claim 11, wherein the phenol resin and the partial-condensate of glycidyl ether group-containing alkoxysilane are used in such a ratio that the glycidyl ether equivalent of the partial condensate of glycidyl ether group-containing alkoxysilane/phenolic hydroxyl equivalent of the phenol resin is in the range of 0.1 to 1.

13. The alkoxy-containing silane-modified phenol resin according to claim 11, wherein the phenol resin is a novolac phenol resin.

14. The alkoxy-containing silane-modified phenol resin according to claim 13, wherein the novolac phenol resin is a alkylphenol novolac resin.

15. A method for preparing an alkoxy-containing silane-modified phenol resin, the method comprising performing epoxy ring-opening reaction between a phenol resin; and, a partial condensate of glycidyl ether group-containing alkoxysilane prepared by dealcoholization reaction between glycidol and a partial condensate of alkoxysilane.

16. A resin composition comprising the alkoxy-containing silane-modified phenol resin of claim 11.

17. An epoxy resin composition comprising the alkoxy-containing silane-modified phenol resin of claim 11 and an epoxy resin.

18. A curing agent for epoxy resin comprising the alkoxy-containing silane-modified phenol resin of claim 11.

* * * * *